(12) United States Patent
     Aarabi

(10) Patent No.: US 9,760,935 B2
(45) Date of Patent: Sep. 12, 2017

(54) METHOD, SYSTEM AND COMPUTER PROGRAM PRODUCT FOR GENERATING RECOMMENDATIONS FOR PRODUCTS AND TREATMENTS

(71) Applicant: ModiFace Inc., Toronto (CA)

(72) Inventor: Parham Aarabi, Toronto (CA)

(73) Assignee: MODIFACE INC., Toronto (CA)

(*) Notice: Subject to any disclaimer, the term of this patent is extended or adjusted under 35 U.S.C. 154(b) by 266 days.

(21) Appl. No.: 14/717,928

(22) Filed: May 20, 2015

(65) Prior Publication Data

US 2015/0339757 A1    Nov. 26, 2015

Related U.S. Application Data

(60) Provisional application No. 62/000,614, filed on May 20, 2014.

(51) Int. Cl.
    *G06K 9/00* (2006.01)
    *G06Q 30/06* (2012.01)

(52) U.S. Cl.
    CPC ......... *G06Q 30/0631* (2013.01); *G06Q 30/06* (2013.01)

(58) Field of Classification Search
    CPC .......................... G06Q 30/0631; G06Q 30/06
    See application file for complete search history.

(56) References Cited

U.S. PATENT DOCUMENTS

| | | | |
|---|---|---|---|
| 7,079,158 B2* | 7/2006 | Lambertsen | A45D 44/005 345/592 |
| 7,376,346 B2* | 5/2008 | Merola | A61B 5/0071 348/77 |
| 2003/0065255 A1* | 4/2003 | Giacchetti | A45D 44/005 600/407 |
| 2005/0063582 A1* | 3/2005 | Park | G06T 17/10 382/154 |
| 2007/0058858 A1* | 3/2007 | Harville | A45D 44/005 382/165 |
| 2013/0129210 A1* | 5/2013 | Na | G06K 9/00268 382/165 |
| 2015/0055085 A1* | 2/2015 | Fonte | G06Q 30/0621 351/178 |

* cited by examiner

*Primary Examiner* — John Strege
(74) *Attorney, Agent, or Firm* — Gowling WLG (Canada) LLP

(57) ABSTRACT

The present invention is a method, system and computer prod act operable to receive one or more images and/or video and to utilize such images/video to generate an analysis that is the basis tor recommendations for products and/or treatments provided to a user. The invention generates statistical analysis particular to person shown in the images/video. The statistical information may be displayed to a user. This statistical analysis may be utilized by the invention to generate recommendations for products and/or treatments for the person shown in the images/video. The invention may further generate an image showing the result of an application of a product or treatment to the person shown in the video. The invention may be provided to a user on a computing device, such as, for example as an App on a mobile device.

20 Claims, 34 Drawing Sheets

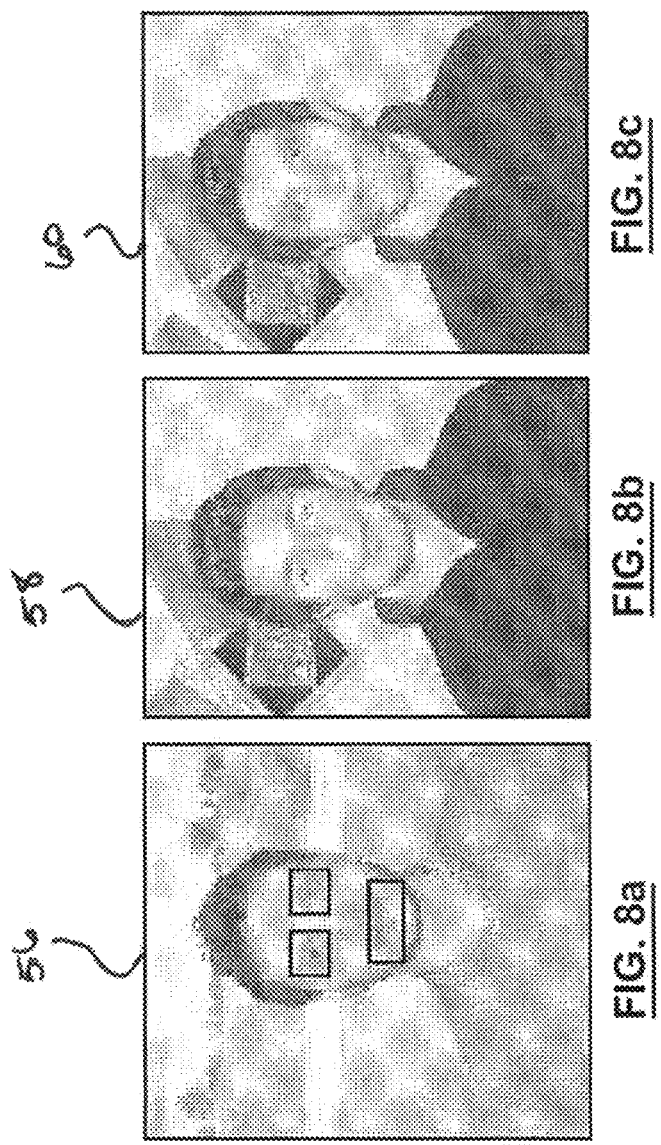

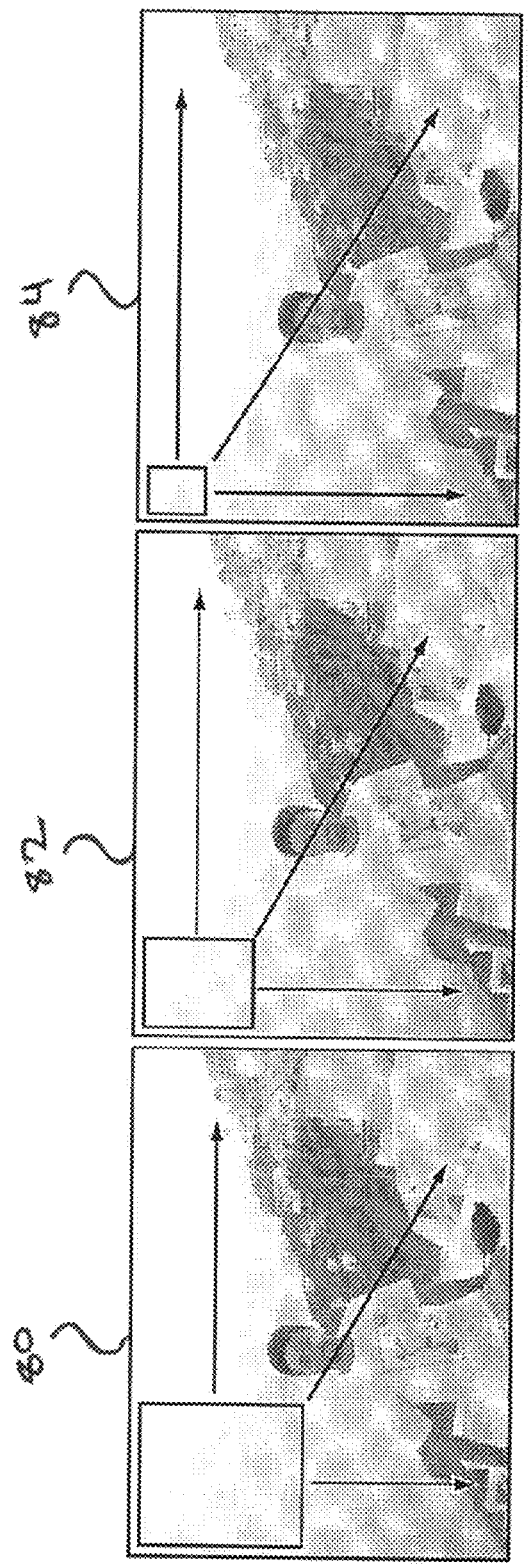

US 9,760,935 B2

METHOD, SYSTEM AND COMPUTER PROGRAM PRODUCT FOR GENERATING RECOMMENDATIONS FOR PRODUCTS AND TREATMENTS

This application claims the benefit of U.S. Provisional Patent Application Ser. No. 62/000,614 filed May 20, 2014.

FIELD OF INVENTION

This invention relates in general to the field of a method, system and computer program product for recommending products and treatments, and relates more particularly to a method, system and computer program product for recommending beauty, skin-care and anti-aging products and treatments based on analysis of a single photo or multi-photo images, or video.

BACKGROUND OF THE INVENTION

While there has been significant-work in face detection (see, for example, Nguyen, D., Halupka, D., Aarabi, P., Sheikholesiami, A., "Real-time Face Localization Using field Programmable Gate Arrays", IEEE Transactions on Systems, Man, and Cybernetics, Part B. Vol 36, No. 4, pp. 902-912, August 2006), there seems to have been little work in the area of body analysis for the purpose of recommending, products or treatments and means of visually displaying possible outcomes of applications of products or treatments.

Specifically, U.S. Pat. No. 6,293,284 granted to Rigg describes a method and apparatus utilizing manual user interaction in order to recolor the facial features and to simulate the effects of cosmetic products. Unfortunately, this approach does not utilize advanced image processing, computer vision or machine learning methodologies and does not simulate applications of products or treatments. A user has to spend significant time and effort in order to manually enter the parameters for the facial recoloring.

Virtual, plastic surgery is the focus of U.S. Pat. Nos. 5,854,850 and 5,825,941 to granted Linford et al. and U.S. Pat. No. 5,687,259 to granted Linford. However, the system disclosed in these references is relatively complicated, and is intended to be an in-clinic system used by professional or experienced operators. Furthermore, the system is not provided on the Internet or through mobile and wireless devices, and does not address utilization of advanced image processing, computer vision or machine learning methodologies for estimating the plastic surgery parameters. As a result, operators are required to manually adjust the system parameters in order to display the results of plastic surgery in a virtual fashion. This system is mostly manual, and does not utilize face localization, feature detection, feature/face recoloring, or visual display of applications of products or treatments on an automatic or semi-automatic basis.

The method disclosed in U.S. Pat. No. 6,502,583 granted to Utsugi utilizes image processing in order to simulate the effects of makeup on a target face. This system, however, does not utilize automatic or semi-automatic face detection, feature detection, or parameter estimation and as a result requires manual user input for estimating the necessary parameters. Furthermore, this system was not intended for general virtual face modifications based on applications of products or treatments.

The system and method of U.S. Pat. No. 6,937,755 granted to Orpaz discloses a manual method for visually demonstrating make-up cosmetics and fashion accessories. This visualization requires manual user inputs in order to work effectively (i.e. it is neither automatic nor semi-automatic), and does not allow for advanced face modifications, or face feature e-coloring and replacement to visualize applications of products or treatments on an automatic or semi-automatic basis.

A system and method is disclosed in U.S. Pat. No. 5,495,338 granted to Gouriou et al. which utilizes eye information (such as the inner eye colors) in order to estimate the ideal eye makeup for a given eye. However, this approach is purely a cosmetics suggestion system; it does not perform any face adjustment, or face recoloring automatically, semi-automatically, or even manually.

U.S. Pat. No. 5,659,625 granted to Marquardt discloses a method involving a geometric model to fit the face. These geometric models can be used tor face animation as well as for cosmetics applications. However, this system does not achieve automatic or semi-automatic feature modification based on applications of products or treatments.

A method tor locating the lips of a face by bandpass filtering is described in U.S. Pat. No. 5,805,745 granted to Graf. However, this reference does not disclose a means for defecting other features of the face, nor does it describe automatic or semi-automatic face modifications. Furthermore, the bandpass filtering method is unsophisticated, and does not involve feature extraction methods utilizing edge, color and/or shape information, or relative feature and face information processing in order to accurately locate the facial features.

The method and apparatus described in U.S. Pat. No. 5,933,527 granted to Ishikawa allows a user to specify a search range that is then used to search for specific facial features. However, the approach taught therein is not capable of automatic facial feature detection, and is incapable of automatic or semi-automatic advancement face processing algorithms.

The invention disclosed in U.S. Pat. No. 7,079,158 granted to Lambertsen is a virtual makeover system and method. However, the reference does not disclose a means for virtual, operations on the face or automatic or semi-automatic advanced face modification, and suffers from a relatively complicated user interface.

The invention disclosed in U.S. patent application Ser. No. 13/813,003 (Publication. No. 20130129210) invented by Seung Won Na discloses a recommendation system based on the recognition of a face and style. This invention is not operable to process multiple images or video, or to preview a recommended look on a user's live video or image. Furthermore, it does not comprise a voting or neural network system for combining results of multiple images.

The invention disclosed in U.S. patent application Ser. No. 13/400,980 (Publication No. 20120223956) invented by Mari Saito and Tatsuki Kashitani is a method for recognizing the facial image in image data, and recognizing facial features of the facial image. A makeup image providing information assisting in the application of makeup is generated and it is superimposed on the facial image to produce output image data. This invention is not operable as a product or treatment recommendation system or method that utilizes multiple images or videos, or a means to preview a recommended product or treatment on a user's live video image. Furthermore, it does not comprise a voting or neural network system or method.

The invention disclosed in U.S. patent application Ser. No. 11/233,599 (Publication No. 20070058858) invented by Michael Harville et al., does not comprise a product recommendation system or method operable based on multiple images or videos. Furthermore, it does not disclose a voting or neural network system or method, or a means for previewing a recommended product or treatment on a user's live video image.

The invention disclosed in U.S. Pat. No. 8,666,844 granted to Johnson & Johnson Consumer Companies discloses a method for predicting or recommending commercially available products based upon input received from consumers. This patent does not disclose the use of any images or videos to detect features of a user in the process of recommending products to a user.

The invention disclosed in U.S. Pat. No. 7,376,346 granted to J&J Consumer Companies, Inc. discloses a method tor assessing the efficacy of skin care products by comparing images of the skin prior to and after use of said skin care product. This patent does not disclose the use of any images or videos to detect features of a user in the process of assessing the efficacy of a product.

The invention disclosed in U.S. Pat. No, 8,661,050 granted to Roy Varshavsky, Moshe Tennenholtz, and Ron Karidi, discloses a system that utilizes relationships between objects and search results for making recommendations. This patent does not disclose the use of any images or videos to detect features of a user in the process of recommending products to a user.

In addition to these prior art references, there are several systems provided on the Internet that are operable to perform manual face modification, for example, EZface™, Approach Infinity Media™. However, none of these systems are capable of face feature modification, advanced face processing, either automatic or semi-automatic. As well, all of these systems employ Macromedia™ flash technology which places a significant computational burden on the client/user computers and is not easily capable of being widely employed on mobile phones and handheld computers. Finally, the user interface complexity of all these systems is problematic as they are generally difficult to use, complicated to adjust, and far more elaborate to use than a simple "choose and modify" approach.

U.S. Pat. No. 8,660,319 granted on Feb. 25, 2014, U.S. Pat. No. 8,620,038 granted Dec. 31, 2013, U.S. Pat. No. 6,265,351 granted Sep. 11, 2012, and U.S. Pat. No. 8,611,673 granted Dec. 17, 2103 to Parham Aarabi, as well as U.S. Patent Application Publication No. 2015/0120719 invented by Parham Aarabi and published on Apr. 30, 2015, and U.S. patent application Ser. No. 14/185,321 invented by Parham Aarabi and filed on Feb. 20, 2014, disclose inventions relating to detecting elements in images. However, none of these prior art references discloses the use of any images or videos to detect features of a user in the process of recommending products to a user.

In view, of the foregoing, what are needed are methods and systems tor modifying digital face images that overcome the limitations of the prior art described above. In particular, what is needed is a method and system employing advanced, detection and localization techniques for enabling recommendations of products and treatments and automatic and/or semi-automatic image modification to display applications of products or treatments. Furthermore, what is needed is a method, and system where such recommendations and facial modifications are processed on host servers instead of the user computers. In addition, what is needed is a method and system that is simple, easy to use, and capable of being implemented on a variety of devices.

SUMMARY OF THE INVENTION

In one aspect, the present disclosure relates to a method for recommending one or more products to a user; (a) receiving a plurality of digital images showing, a person provided by the user; (b) detecting a face of the person in the plurality of digital images; (e) establishing a plurality of regions of interest in the face in the plurality of digital images; (d) detecting one or more features in the plurality of regions of interest in the face in the plurality of digital images, said one or more features including one or more facial features of interest and one or more other facial features, involving the use of image gradient intensities to detect a plurality of individual features if the location of features in the plurality of digital images is not previously established; (e) performing multi-level statistical analysis of the plurality of digital images to produce user information; (f) displaying user information to the user; and (g) recommending one or more products to the user, based on a database; of products reviewed in accordance with the multi-level statistical analysis.

Such a method of the present invention further comprising the step of: modifying a digital image from the plurality of digital images by modifying one or more features in the face in the digital image by combining the one or more features in the digital image with corresponding features in relating to the one or more products recommended to the user by blending the one or more features relating to the one or more products recommended to the user into the digital image, thereby defining a modified digital image.

Such a method of the present invention further comprising the features to include eyes, eyebrows, nose, month, lips or hair.

Such a method of the present invention further comprising blending, recoloring, shifting or resizing the one or more features in the face in the second digital image.

Such a method of the present invention further comprising adjusting size and location of the one or more features in the face in the second digital image in the modified digital image to increase the perceived beauty of a face in the modified digital image.

Such a method of the present invention further comprising color adjusting the one or more features in the face in the second digital image to correspond with the face in the first digital image, or color adjusting the features of the face in the first digital image to correspond to the modified first digital image.

Such a method of the present invention further comprising the further step of undertaking the multi-level statistical analysis of the plurality of digital images to incorporate analysis of the plurality of digital images as individual images and as a collection of images.

Such a method of the present invention further comprising the further step of assigning a vote to each of the plurality of images and the vote is binary or real-valued.

Such a method of the present invention further comprising the further step of generating a neural network connection through use of the vote being real-valued.

Such a method of the present invention further comprising the plurality of digital images being derived from video, by the step of detecting a plurality of video frames in the video that show the person.

In another aspect the present invention relates to a system for recommending one or more products to a user comprising: (a) a computer linked to a database, the computer including or being linked to a utility for enabling one or more users upload, store, retrieve, email, display and/or manage digital images; (b) a processing utility linked to the computer, the processing utility being operable to provide instructions to the computer that enable the computer to: (i) receive a plurality of digital, images showing a person provided by the user; (ii) detect a face of the person in the plurality of digital images; (iii) establish a plurality of regions of interest in the face in the plurality of digital images; (iv) detect one or more features in the plurality of regions of interest in the face m the plurality of digital images, said one or more features including one or more facial features of interest and one or more other facial features, involving the use of image gradient intensities to detect: a plurality of individual features if the location of features in the plurality of -digital images is not previously established; (v) perform multi-level statistical analysis of the plurality of digital images to produce user information; (vi) display user information to the user; and (vii) recommend one or more products to the user, based; on a database of products reviewed in accordance with the multi-level statistical analysis.

Such a system of the present, invention further comprising the processing utility being operable to provide instructions to the computer that enable the computer to modify one or more features in the face in the digital image by combining the one or more features in the digital image with corresponding features in relating to the one or more products recommended to the user by blending the one or more features relating to the one or more products recommended to the user into the digital image, thereby defining a modified digital image.

Such a system of the present invention further comprising the system being provided to the user as a website or as an application on a mobile computing device.

Such a system of the present invention further comprising the system being operable to apply the multi-level statistical analysis to the plurality of digital images, said multi-level statistical analysis incorporating an analysis of the plurality of digital images as individual images and as a collection of images.

Such a system of the present invention further comprising the system, the multi-level statistical analysis involving the system assign a vote to each of the plurality of images and the vote is binary or real-valued.

Such a system of the present invention further comprising the vote being real-valued and a neural network connection is generated based upon said vote.

Such a system of the present invention further comprising the plurality of digital images being derived from video, by the step of detecting a plurality of video frames in the video that show the person.

In yet another aspect the present invention is a non-transitory computer readable medium for recommending one or more products to a user, said non-transitory computer readable medium comprising: (a) a computer readable medium hearing software instructions; and (b) the software instructions for enabling the computer to perform predetermined operations, the predetermined operations including the steps of: (i) receiving a plurality of digital images showing a person provided by the user; (ii) detecting a face of the person in the plurality of digital images; (iii) establishing a plurality of regions of interest in the face in the plurality of digital images; (iv) detecting one or more features in the plurality of regions of interest in the face in the plurality of digital images, said one or more features including one or more facial features of interest and one or more other facial features, involving the use of image gradient intensities to detect a plurality of individual features if the location of features in the plurality of digital images is not previously established; (v) performing multi-level statistical analysis of the plurality of digital images to produce user information; (vi) displaying user information to the user; and (vii) recommending one or more products to the user, based on a database of products reviewed in accordance with the multi-level statistical analysis.

Such a non-transitory computer readable medium of the present invention further comprising the software instructions including predetermined operations including the step of: modifying a digital image from the plurality of digital images by modifying one or more features in the face in the digital image by combining the one or more features in the digital image with corresponding features, in relating to the one or more products recommended to the user by blending the one or more features relating to the one or more products recommended to the user into the digital image, thereby defining a modified digital image.

Such a non-transitory computer readable medium of the present invention further comprising the non-transitory computer readable medium being operable to apply the multi-level statistical analysis to the plurality of digital images, said multi-level statistical analysis: (a) incorporating an analysis of the plurality of digital images as individual images and as a collection of images; (b) assigning a vote to each of the plurality of images and the vote is binary or real-valued, said vole being real-valued; and (e) generating a neural network connection based upon the vote.

Such a non-transitory computer readable medium of the present invention further comprising the plurality of digital images being derived from video, by the step of detecting a plurality of video frames in the video that, show the person.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The invention will be better understood and objects of the invention will become apparent when consideration is given to the following detailed description thereof. Such description makes reference to the annexed drawings wherein:

FIG. 8a, FIG. 8b and FIG. 8c illustrate replacement steps;

FIG. 11a, FIG. 11b and FIG. 11c illustrate a progression of search box sizes in face detection;

DETAILED DESCRIPTION OF THE PREFERRED EMBODIMENT

Figure 1A:
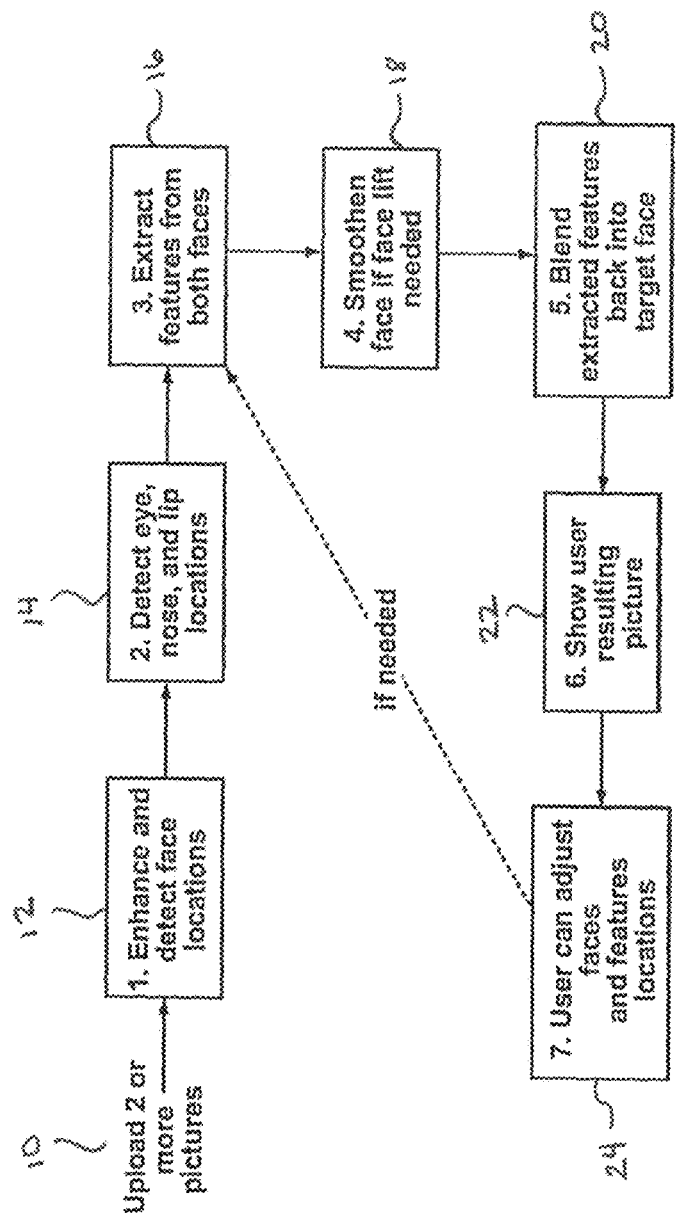
FIG. 1A illustrates a flow chart of method steps of the present invention.

The present invention, is a method, system and computer product operable to receive one or more images and/or video and to utilize such images/video to generate an analysis that is the basis for recommendations for products and/or treatments provided to a user. The invention generates statistical analysis particular to person shown in the images/video. The statistical information may be displayed to a user. This statistical analysis maybe utilized by the invention to generate recommendations for products and/or treatments for the person shown in the images/video. The invention may further generate an image showing the result of an application of a product or treatment to the person shown in the video. The invention may be provided to a user on a computing device, such as, for example as an App on a mobile device.

The present invention may be utilized by a user on a variety of types of computing devices that have a display means and an input means incorporated in the computing device or attached thereto (the connection can be wired or wireless). The input means may be a touchscreen operability. Herein "computing device" references any of the following: a desktop computer, a laptop computer, a tablet, a smart phone, a cellular phone, a wearable computing device, or any other mobile or stationary computing device.

The present invention is operable for a user to create a user profile. The user profile information may be stored in a database that is connectable (e.g. connectable by wired or wireless connection), and data generated and/or gathered by the present invention (e.g., analysis data, statistical data, user activity data, or other data) may also be stored in the database from each session when the user utilizes the present invention. The user profile information may therefore incorporate information the user provides to the invention through an input means of the computing device the user utilizes to operate the invention, for example, such as a keyboard, or a touchscreen keyboard, or any other input means. The user profile may farther incorporate information generated or gathered by the invention, such as statistical results, recommendations, information gathered from social network sites, such as Facebook™, as described herein. The user may input information such as the user's name, the user's email address, social network information pertaining to the user, the user's age, or other information relating to the user.

The present invention may access social network sites through an internet connection and may retrieve information, including images or video, user information, or other information, from social network sites.

The computing device that the user utilizes to access and operate the present, invention may further be operable to access one or more images and/or video content. For example, such as images/video stored in a database connected to the present invention system, files stored on the computing device that operates fire system, or some other storage area where images and/or video is stored. The computing device may also have a camera attachable thereto, or integrated therein, that is operable to generate images and/or video.

The computing device may be connected to one or more databases, including a database wherein product and/or treatment information is stored. The databases that the system is connected to are accessible by the system for storage and retrieval purposes, information accessed and/or retrieved from a database may be utilized by the present invention, including information retrieved from a product/treatment database that is utilized by the invention to generate product and/or treatment recommendations. This database of product and/or treatment information may be accessible by an administrator or by multiple authorized persons who can add, modify, or delete product and treatment information stored in the database. The present invention may incorporate a module operable to gather product and/or treatment, information to be utilized by the present invention, including details relating to products and/or treatments stored in the databases, such as availability of products/treatments, locations where products/treatments are provided, updated health information, relating to products/treatments, and other like information.

Product and treatment information may include various types of information relating to a product or a treatment, and may include statistical information or other forms of information relating to the attributes of a person who can benefit from use of the product or treatment or to whom a product or treatment is targeted. The information may further indicate attributes of a person to whom the product or treatment is designed to be applied. The statistical information or other information relating to a product or treatment can be utilized by the present invention to identify products and/or treatments to be recommended to a user based upon an analysis of images/video of a person.

In one embodiment of the present invention, the system is provided to a user as a computer application (i.e., an "App") through a mobile computing device, such as a smart phone, a tablet, a wearable computing device, or other computing devices that are mobile and: configured to provide an App to a user. In other embodiments of the present invention, the system may be provided to a user on a computer device by way of a network, through the Internet, or directly through hardware configured to provide the system to a user.

The present invention has several embodiments, as described herein. One embodiment of the present invention is operable to receive one or more images and/or video content provided to the system by the user. For the purposes of this description of the present invention any reference to an image and/or video utilized by the present invention is a reference to an image and/or video that is in a digital format.

As described herein, the user may utilize a camera (that is attached to the computing device utilized by the user to operate the invention) to generate video and/or one or more images. The one or more images and/or video may also be either accessed from storage on the computing device, from, storage accessible by the computing device (such as a server or external hard drive), or transmitted directly between the camera and the system. As one example, the images or video may be stored in a digital album. As yet another means of obtaining images and/or video, a user may utilize the present invention to access and obtain images and/or video from a social media account, such as Facebook™. Images and/or video may be provided to the system by the user through, any one of these storage locations (e.g., servers, hard-drives, internal device storage, a camera, or social media sites), or through multiple storage locations.

The present invention may be utilized by a user to generate a recommendation for beauty and skin-care products for use by a person who is shown in the images and or video (as is provided by the user to the present invention). For example, such products may be for skin, anti-aging, face, nails, and hair, or any other beauty or health product. As a further example, products may include creams, cosmetics, nail polish, shampoo, conditioner, other hair products, vitamins, any health related products of any nature, or any other product that offer results visible in a person's appearance, such as a person's skin, hair, nails or other aspects of a person's appearance. Examples of treatments may include diet treatments, physical fitness treatments, acupuncture treatments, appearance modification treatments, or any other treatment that offers results visible in a person's appearance.

The present, invention is operable to analyze one or more images and/or video showing a person. This analysis is utilized by the system to generate statistics information that can be displayed to a user in a variety of formats and combinations. Moreover, the analysis can be utilized by the present invention, to generate product and/or treatment recommendations. Generally the products and/or treatments that are recommended are products and/or treatments that are stored in a database accessible by the system.

One embodiment of the present invention consists of steps for generating a product recommendation (and/or treatment recommendation) and user profile analysis, including: (i) receiving, on a computing device, one or more images of a person; (ii) detecting faces in the one or more images; (iii) detecting facial, features or other facial characteristics from each of the one or more images; (iv) determining statistics of the overall facial features; (v) displaying, on a computing device, the statistical results, in part or in entirety, to the user; and (vi) optionally recommending beauty products based on the obtained statistical information.

A reference to facial features herein includes any feature in a person's face, such, as eyes, lips, skin-tone, skin undertone, skin age, wrinkle levels, spots, and blemishes.

An embodiment of the present invention may be operable to identify features appearing on other areas of person's body, such as fingers on a hand, toes on a foot, moles or other markings appearing on a person's skin, etc. Such, an embodiment may be operable to generate recommendations of products and/or treatments based upon analysis of features in regions of a person's body, or based oh features in a person's face as well as features in other areas of a person's body. Art example of a recommendation that may be related to features in a person's face as well as other areas of a person's body may be a product to reduce the development, of freckles on a person's face as well as on-other areas of the person's body that may be exposed to the sun. A skilled reader will recognize, that there arc other examples of products/treatments that, may be recommended for application to a person's face and/or other body areas. References herein to detection, analysis and modifications to a person's face may be understood to be also applicable to other areas of a person's body having identifiable features.

Statistics relating to the overall facial features that may be determined by the present invention include any of the following: a histogram of lip colors, average wrinkle level, average spots, level of dark circles under the eyes, level of crows feet, depth of smile lines, average skin-tone, average skin undertone, histogram of blush colors, histogram of cosmetic colors, or other statistics that, can be generated based upon an analysis of the images/video.

Another embodiment of the present invention operable to generate product and/or treatment recommendations and user profile analysis may include the following steps: (i) scanning a user's face through a series of video frames taken of the user; (ii) detecting faces in the one or more video frames; (iii) detecting facial features or other facial characteristics from each of the video frames; (iv) determining statistics of the overall facial features; (v) recommending beauty products based on the obtained statistics by matching the user's statistics to a database of beauty product recommendations; and (vi) optionally previewing the recommended products on the person's video.

Another embodiment of the present invention may utilize both images and video to generate recommendations and to generate statistical information.

All of the images/video that the user provides to the system for a particular analysis/recommendation process should show the same person. This allows me processing and analysis of the system to generate statistics, recommendations and other output that is specific to the person shown in the images/video.

In one embodiment of tile present invention the person shown in ail of the images/video may be the user. In such an embodiment of the present invention the user profile information can be utilized by the present invention along with the images/video to generate the statistics, recommendations and other output.

In an embodiment of the present invention the system is operable to recommend specific products or treatments that correspond to the data generated by the system (or otherwise obtained by the system) to generate a personal analysis for the person shown, in the images/video. The system may also generate a preview of the results of the application of the recommended product or treatment directly on the video or images provided by the user to the system. The preview may illustrate on the user's video or image how multiple products/treatments could be layered. The present invention may further generate visual educational step-by-step instructions for user to achieve a recommended application of one or more products and/or treatments.

The following are examples of some embodiments of the present invention.

Example—Cosmetic Foundation Product Recommendation

As an example, the present invention may be utilized to generate a recommendation relating to a cosmetic foundation product. In such an example, the present invention is operable to scan images/video provided by the user to determine the skin tone, texture and undertone of the person shown in the images/video. The system utilizes this information to generate a recommendation of one or more foundation shades that would be suitable for the person to apply. The system may generate and provide a visual display to the user of the user information based on statistical information that relates specifically to the determination of skin tone, texture and undertone. The system may further generate and provide to the user a visual display of an image of the person with one or more of the foundation, products applied to the person's skin. The system may additionally generate step-by-step instructions (incorporating text, images, or a combination of text and images) to be used to apply the foundation product.

Information relevant to a recommendation for a cosmetic foundation, product may include skin-tone, undertone, and other skin related information. The present invention is operable to analyze a series of photos (or, equivalently, a series of video frames) and in keeping with the present example, such analysis may involve detecting the skin portion of the image. From each skin portion the average red-green-blue (RGB) values of the image are analyzed. This analysis corresponds to a determination of the average skin color. The system is operable to adjust for lighting, and to facilitate such, an adjustment only a preset, statistical portion of the pixels in the portion of the image showing a skin portion may be analyzed in the aggregation, for example, such as taking the x% brightest pixels. One option is for the system to take the x% percentile to the y% percentile brightest pixels, with x ranging from 0-80 and y ranging 0-50. The system detects the average tone of the skin of the person through this analysis.

The images are then analyzed to detect the undertone of each image. This analysis involves a determination as to whether the average RGB of an image is above or below a certain threshold. The threshold can be hardcoded into the system, may be generated through use of the system overtime, can be set by a system administrator, or can be accessed by the system from a location external or internal to the system (such as an Internet site, or a storage means, such as a database or a server).

The present invention may further analyze the RGB in the hue-saturation-value (HSV) or hue-saturation-lightness (HSL) color domains to detect the undertone in an image.

The one or more images to the collection of images provided by the user are analyzed, and the results of these analyses may be collectively analyzed. For example, based on each image a vote may be generated and assigned to an image based on the undertone determination relating to the image. Collectively these votes may be utilized by the system to produce an overall average of skin-tone relating to the collection of images. The voting mechanism applied by the present invention can be binary, or can be real-valued.

A real-valued voting mechanism applied by the system may act as a neural network connection. Different images would provide different input weights depending on the image's score confidence, number of detected skin pixels, as well as other visual or image-dependent information. The brightest and darkest coloured images can be discarded, to remove outliers. Based on the skin under-tone vote, and based on the skin colour average, the end color and undertone may be detected. The detected end colour and undertone may be reported to the user.

In this example of the present invention operable to recommend a foundation product to a user, the detected end colour and undertone are further utilized by the system to match specific foundation shades for the purpose of recommending a foundation product to a user.

Example—Aging Focused Products/Treatments

As another example, if the present invention incorporates analysis relating to aging, a collection of images showing a person may be analyzed by the system to measure the overall health of the person's skin. For example, pore size, blemishes, wrinkles, and other indications of skin health may be determined when the images are analyzed. Based upon the results of the analysis, the system may generate personalized skincare treatment recommendations for the person shown in the images to achieve healthier looking skin. The system may also recommend skin-care products, such as anti-aging products, to help the person shown in the images care for their skin.

Example—Colour Cosmetic Product Recommendation

As a further example, the present invention may generate a colour cosmetics recommendation. In such an application, the system may analyze the images showing a person to determine the colour of the cosmetics, that the person most often applies, such, as the colour of lipstick, eye shadow and/or blush that the person frequently applies in the images. Based on this information the system may generate recommendations of colour cosmetic products available in similar shades.

In one embodiment of the present invention, it may be possible to purchase the recommended products, or other products, directly from the system, including from an embodiment of the present invention that is provided as an app.

If the collection of images that the User provides to the system shows the person over a period of time, such as over multiple days, two or more seasons, etc,, the system may be operable to analyze how the colour of the cosmetics worn, by the person changes over time. This analysis can be utilized to display for the user how the color preferences of the person shown in the images differs over time, such as from one season to the next.

In such an embodiment of the present invention the information pertaining to the lapse of time between images, and the order of the images within a time line may be determined from the metadata relating to the images. Generally the image metadata will include a time stamp for each image. A skilled reader will recognize that there may be other means of determining the time relationship of the collection of images for the purpose of the system's analysis of the images described herein.

Example—Hair Colour Product Recommendation

As yet another example, the system may analyze the hair of the person shown in the images. The system may track variation of a person's hair color over time. The system may utilize this analysis to generate recommendations of hair color products for the person. These recommendations may be related to specific periods of time, such as particular seasons.

The foregoing embodiments of the invention are provided merely as examples. Other embodiments incorporating other analysis and processing of images/Video to generate other statistical information may be performed by the system, and other types of recommendations may be generated by the system.

Embodiments of the present invention may incorporate any collection of analyses based upon a person's attributes shown in a collection of images and/or video for the purpose of recommending products and/or treatments to a user. For example, the texture of a person's hair (e.g. dry, oily, etc.), drooping of a person's eyelids over time, the increase of wrinkles in a person's face over time, the shaping of a person's eyebrows, the shadows under a person's eyes, the prevalence of acne, a rash or other skin blemishes, and other facial or body features may be analyzed in a collection of images and/or video for the purpose of recommending products and/or treatments to a user.

The present invention offers several benefits over the prior art. Generally, the present invention fills a gap that exists in the prior art. The prior art does not provide for a system operable to generate a body analysis based on one or more images/video for the purpose of recommending products or treatments, or any means of visually displaying possible outcomes of applications of products or treatments. The present invention offers a system with these operabilities.

The prior art systems that allow for the display of any facial modifications, such as recolouring. involve a manual user interaction in order to recolour the facial features and to simulate the effects of cosmetic products. The present invention incorporates advanced image processing and analysis, and is operable to simulate applications of products or treatments. Therefore, a user of the present invention does not have to spend significant time and effort in order to manually enter the parameters for the facial reentering, as is required for prior art systems.

Prior art systems that produce modifications to an image of a person to show the application of products or treatments are relatively complicated to operate. Such prior art systems are generally intended to be an in-clinic system operated by a professional or experienced operators to show outcome of treatments/product use. The operators are required to manually adjust the system parameters in order to display the results of a treatment, such as plastic surgery, in a virtual fashion. The prior art systems do not utilize face localization, feature detection, feature/face recoloring, or visual display of applications of products or treatments on an automatic or semi-automatic basis. The present invention incorporates, advanced image processing, computer vision or machine learning methodologies to generate a recommendation for a product, and/or treatment for a person. The present invention offers a further benefit over the prior art in that the present invention system is provided through mobile and wireless devices, and may be provided as an App.

The prior art is generally directed to recognizing a face and a style. The present invention offers a benefit over the prior art in that it is operable to process multiple images or video, or to preview a recommended look on a user's live video or image. The present invention also incorporates the element of voting or a neural network system for combining results of the analysis of individual images to generate an analysis relevant to multiple images.

As illustrated in the flowchart of FIG. 1A, the first step in one-particular implementation of the present invention, is to upload the one or more images or video to a web server.

The images or video are generally uploaded to a web server connected to the Internet, such web server incorporating standard resources and functionality generally used tor a web server that is operable to receive uploaded digital images or video from a plurality users, store the digital images or video, and enable users to access selected digital images or video based on hierarchical access thereto, as well as sort and manage digital images or video to which they have access. The same server and method may be utilized to upload, store and access videos and the one or more digital images.

Figure 1B:
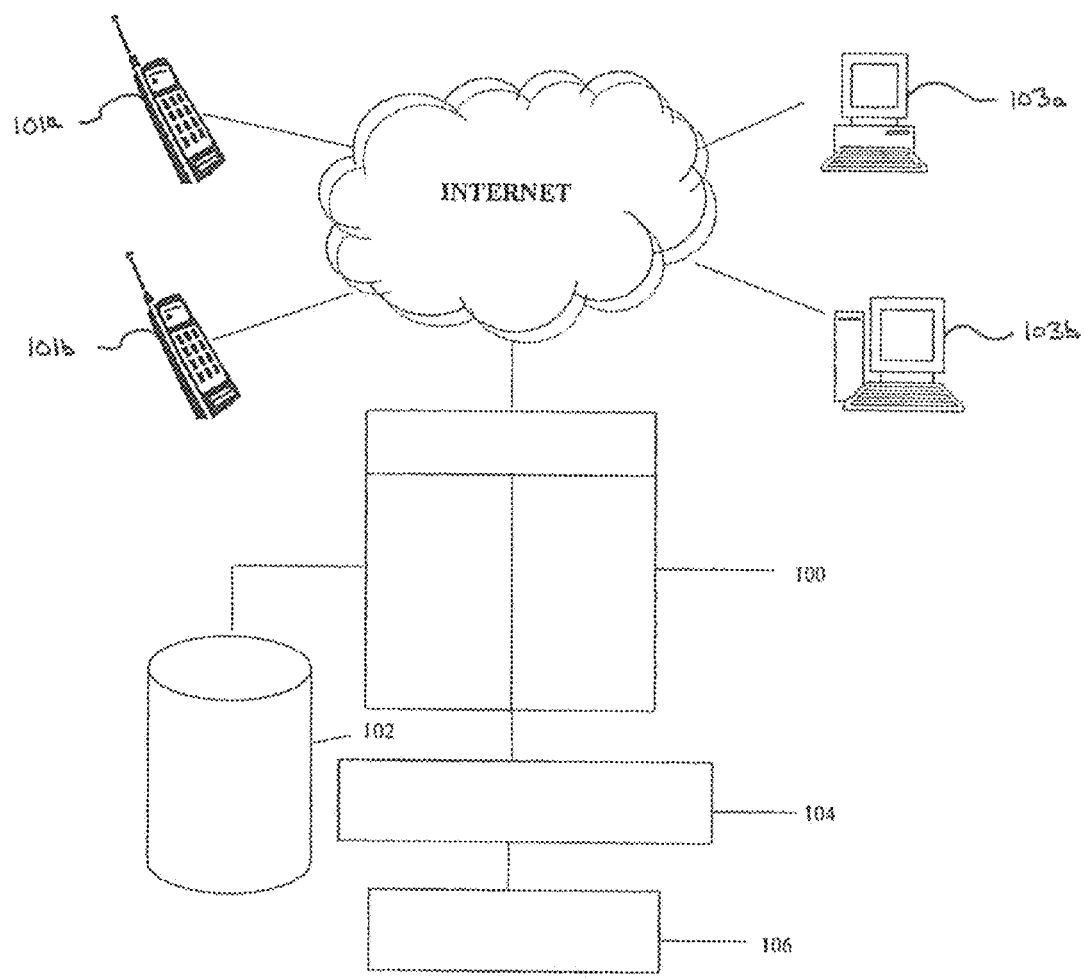
FIG. 1B is a system diagram illustrating one embodiment of the system of the present invention.

A representative embodiment of such architecture is illustrated in FIG. 1B. The web server (100) is linked to a database (102) and to a server application (104). The server application (104) incorporates the standard features described above, and linked to the database (102) provides the image storage, retrieval, sorting and management features mentioned above. In accordance with the present invention, the server application (104) also incorporates a modification utility (106), which is programmed, in a manner that is known to incorporate the functionality described below.

The database (102) may further be operable to provide storage, retrieval, sorting and management features relating to the products and treatments and related information that are utilized by the-present invention to provide recommendations to a user, as described herein.

The system may be linked to one or more- computerized devices, such as one or more mobile devices (101*a*, 101*b*) and/or one or more other types of mobile devices (103*a*, 103*b*). A user may access, operate and otherwise use the system through a computerized device that is connected to the system. Examples of embodiments of the present invention include versions Of the invention that may be provided to a user as a website accessible and operable from a computerized device, as an App accessible and operable from a mobile computerized device, or in any other means whereby the present invention is provided to a user.

Generally herein, any reference to video or images provided by a user as being utilized by the present invention, should be understood to reference video, images (one or more images), or video and images (one or more images), as the present invention is operable to utilize video, images (one or more images), or video and images (one or more images) in its method and system described herein.

One aspect of the invention therefore is a product or treatment recommendation system that incorporates the functionalities of processing, analysis, and recommendations based on images (106). FIG. 1B illustrates one particular implementation of the system of the present invention, i.e. implementation as a web service provisioned by web server (100) to remote computers (personal computers or mobile computing devices for example).

Generally herein, any reference to the present invention operating to produce a product recommendation or a treatment recommendation should be understood as indicating that the present invention is operable to produce any of the following, a product recommendation, a treatment recommendation, or a product and treatment recommendation.

It should be understood that the present invention contemplates numerous implementations. For example the system of the present invention may include a personal computer, and loaded thereof a client application incorporating the modification utility. It should also be understood that the computer program of the present invention can be provided as a network application, accessible to a plurality of computers, as an ASP solution delivered to a plurality of personal computers, or to a plurality of web server that in turn provision remote computers (for example by providing the functions of the present invention as a means of enhancing the features made available by web servers providing on-line community functionality). The system, or aspects thereof, can also be integrated with numerous existing tools, for example, software tools used by health clinics, beauty stores, spas, doctor offices, or cosmetic surgery clinics. It should also be understood that the system of the present invention can work with mobile devices and handheld devices and can be delivered as an App. The present system may be displayed to a user on their mobile device directly and: this display may occur in real-time or virtually real-time.

Figure 2:
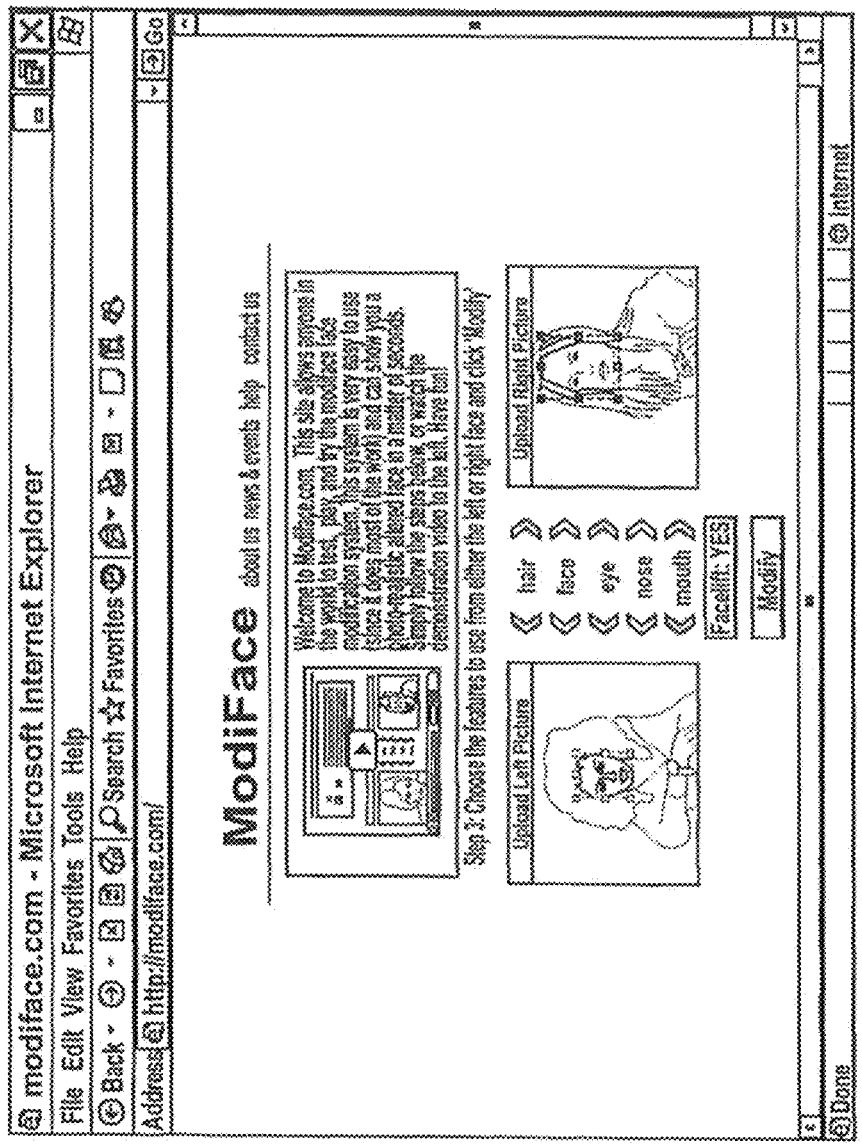
FIG. 2 and FIG. 3 illustrate an example web interface for an embodiment of the system of the present invention.
Figure 3:
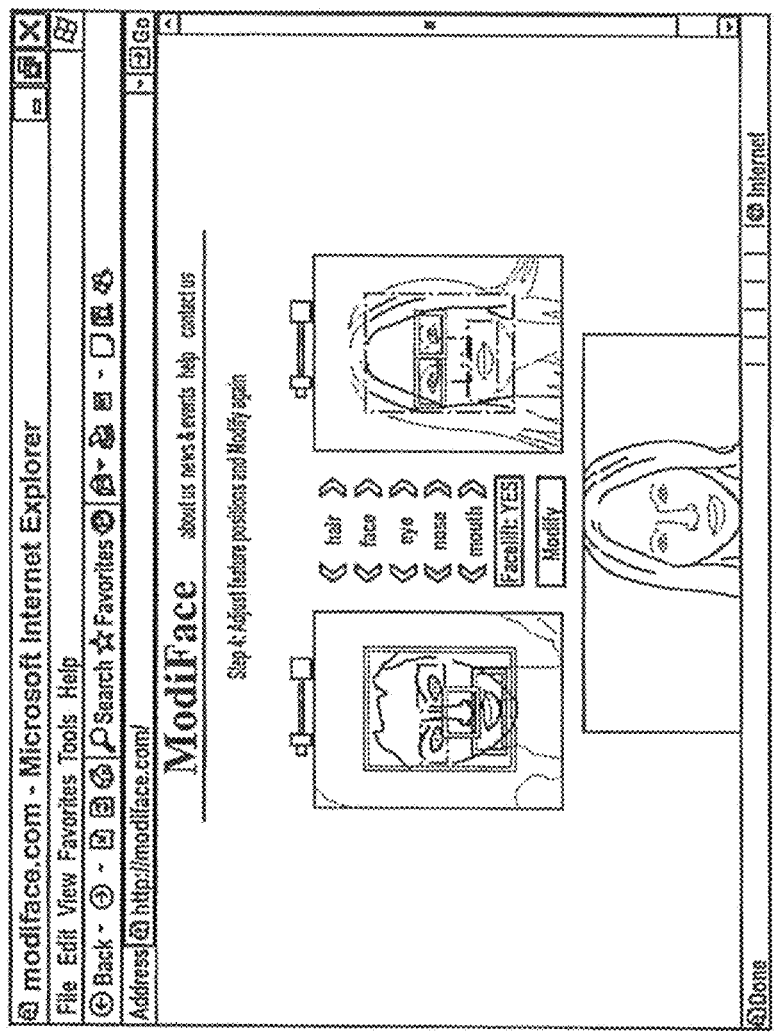

In one particular implementation of the present invention, illustrated in FIGS. 2 and 3, the web server (100) (shown in FIG. 1B) presents a web page (26, 28) that permits users to upload images or video or select images or video already available on the web server (100) and initiate the recommendation and modification features described below.

In one aspect of the present invention, as shown in FIG. 1A, the system of the present invention first detects the location of the face (12) and facial features (14) of the digital images, including the eyes, nose, and lips.

As disclosed herein, the present invention may further undertake the steps to produce a post-application image or video that include extracting features (16), smoothing the face (18) if a face lift is required in accordance with the invention described herein, blending tie extracted features back into the face in an image (20) to generate an amended image, displaying the amended image to a user (22), and the user may adjust faces and feature locations (24) in the amending image. The method of the system may at this point return step (16).

In embodiments of the present invention wherein the system is operable to generate an image that displays a face after products and/or treatments have been applied, the system may utilize features stored in the database of the system that shows one or more features after the product or treatment is applied. The features may need to be extracted from an image stored in the product/treatment database. The features may be blended into a face, in the manner described herein, to generate a post-application image wherein the effects of application of the products and/or treatments is visible in the person's face for an area of the person's body other than the face, as applicable). Thus, references herein to utilizing features from, a second image and blending these features into a first image can be understood to indicate an invention whereby the second image or features are obtained from the product/treatment database. The post-application, image and/or post-application features may be blended into an image of a person that is one of the images provided to the system by the user.

The present invention may incorporate a process whereby a smart facial image enhancement is performed. A smart facial image enhancement involves taking a digital image, automatically or semi-automatically (comprising of an initial automatic identification followed by user intervention) identifying the face, and optionally performing histogram equalization or contrast adjustment on the lace followed by blending the equalized histogram onto the original digital image. The blending approach involves a gradual blending such that it is more heavily equalized in the center of the face and less so around the edges. Also, only partial histogram equalization is performed in order to not upset, the balance of colors on the face significantly, which can cause distortion, in one particular aspect of the invention, this is accomplished by performing a weighted or partial image histogram equalization which places more weight on the digital image pixels near the boundaries than digital image pixels near the center.

The histogram information generated by the present invention relating to images/video, and other statistical information generated by the present invention may be displayed to the user, as described herein.

Once a user accesses the present invention the user will be required to provide one or more images, or video to the system. The images or video should all show the same person. The person may be the user, or another person. If the images show the user the user profile information may be utilized by the system in the analysis and processing performed by the system and utilized by the system to generate recommendations of products and/or treatments to a user. For example, the user's age may be utilized by the system should it determine that multiple products and/or treatments may be applicable to a user, to determine from the identified group of products and/or treatments that certain of the products/treatments are more useful for the user based upon the user's age. Certain products and/or treatments may be focused on the needs of people within a particular age range and this information may be included in the information relevant to a product/treatment in the product/treatment database. Gender is another user profile attribute that may be utilized by the system to determine appropriate recommendations for products/treatments, as some products/treatments are applicable to persons of particular genders.

Figure 24:
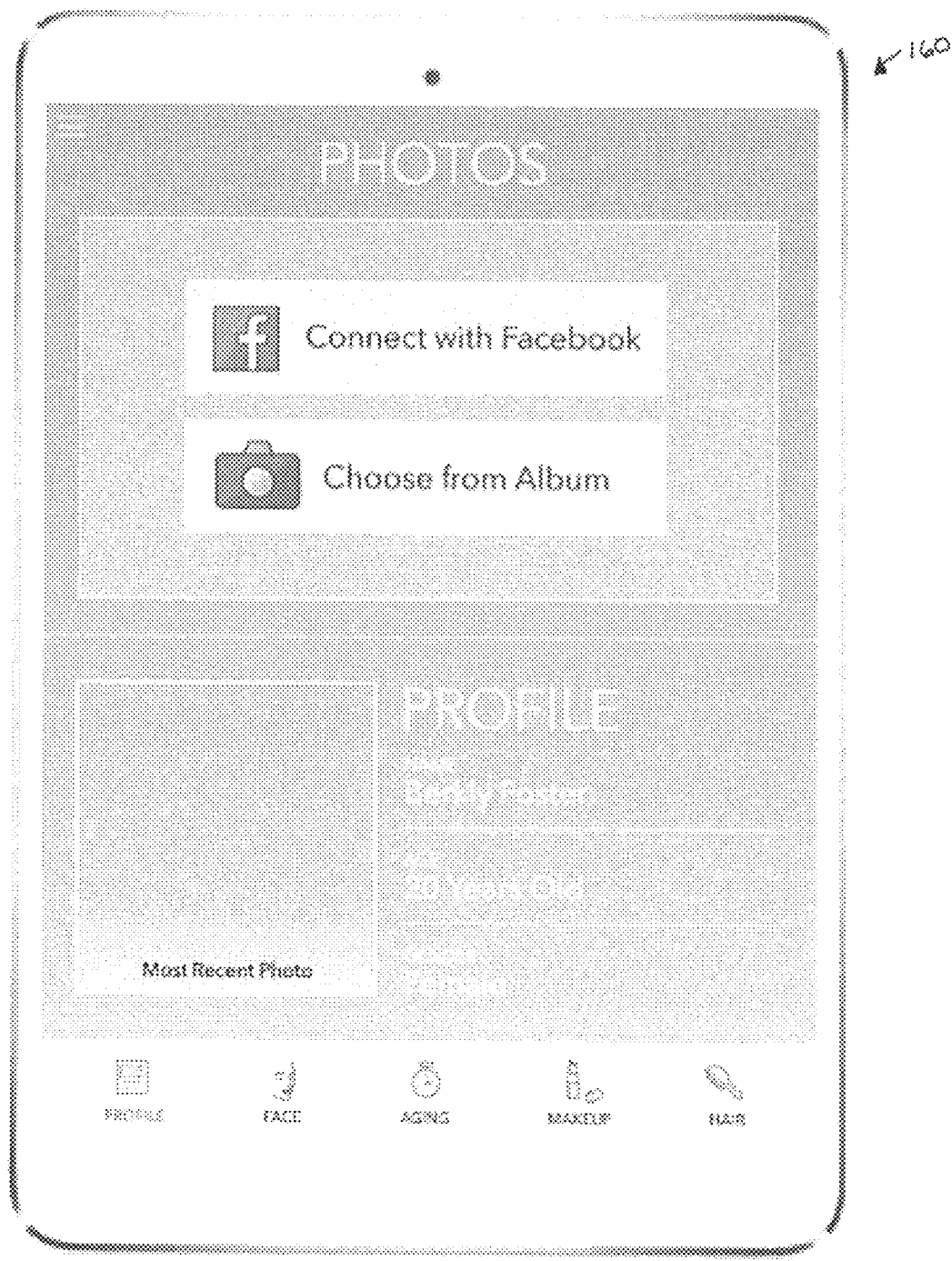
FIG. 24 illustrates an embodiment of the present invention provided as an app whereby a user profile is generated and images and video can be chosen from social media or an album available via a computer device.

As shown in FIG. 24, some of the user profile information may be displayed to the user (160) by the present invention.

Figure 22:
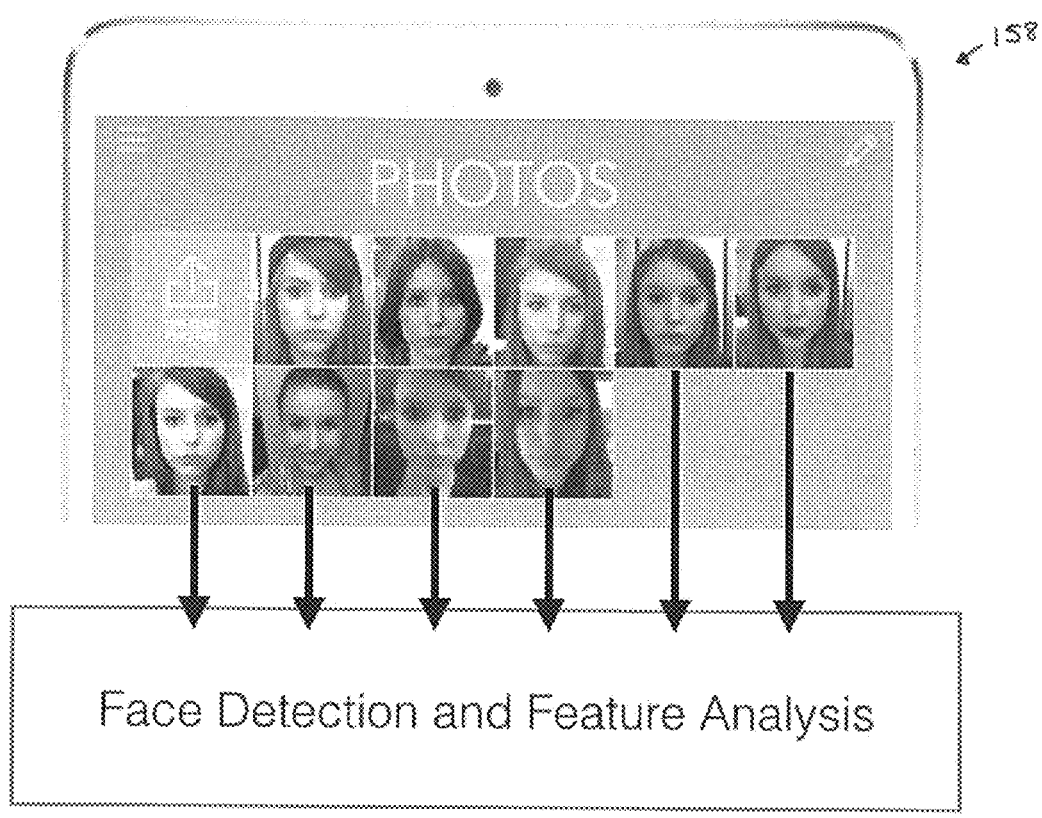
FIG. 22 illustrates an embodiment of the invention that utilizes multiple images for face detection and feature analysis.

As shown in FIG. 22, the user may provide the one or more images or video to the system, and the system may process the images individually, or identify the frames within a video and process the frames individually. The processing of the images and/or video frames may involve face defection and feature analysis performed by the system for each individual image or video frame (158).

Figure 25:
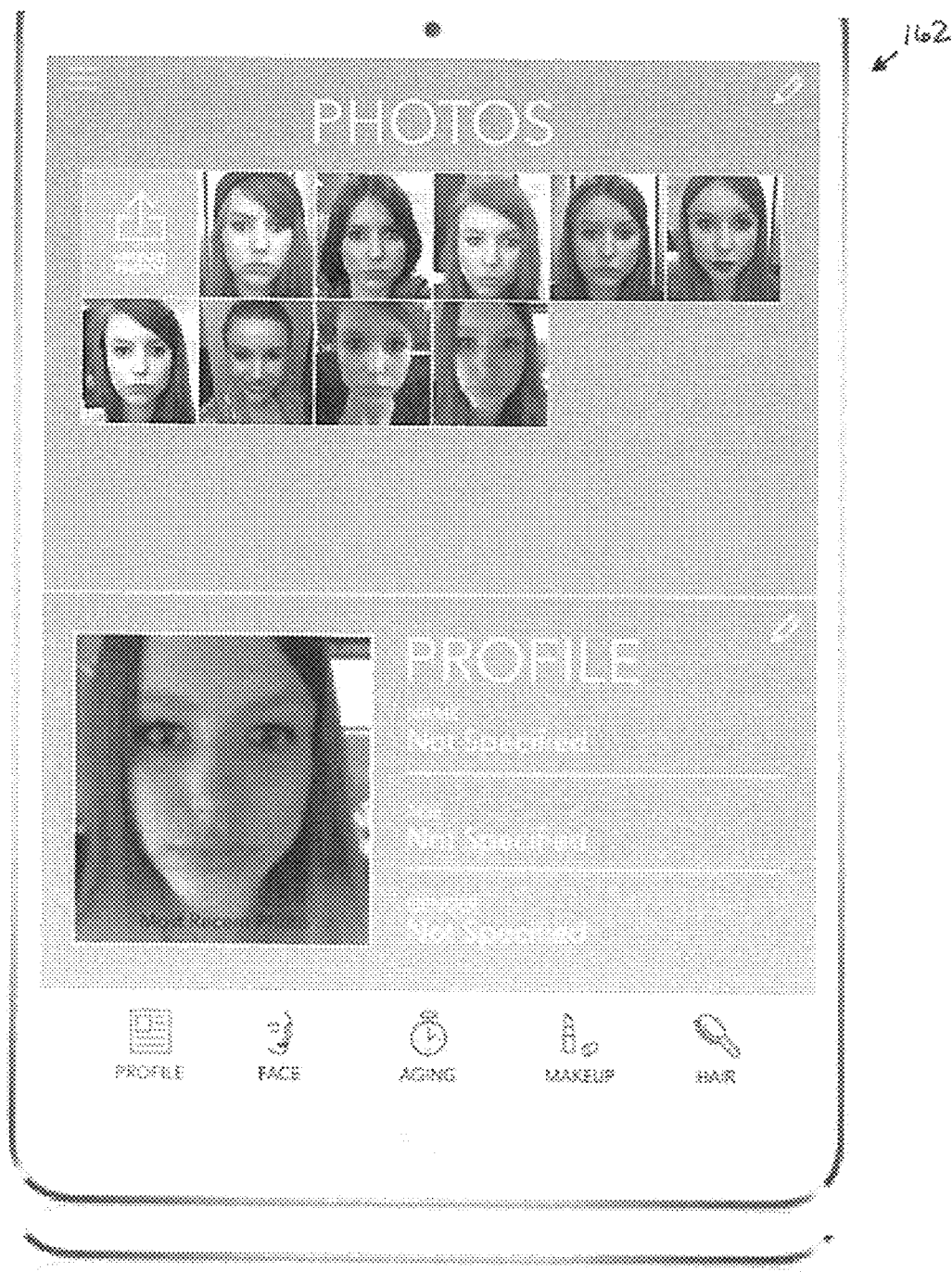
FIG. 25 illustrates an embodiment of the present invention having an image incorporated in the user profile.

As shown in FIG. 25, the images that a user provides to the system and the user profile information maybe displayed to a user (162). In embodiments of the present invention the user may be required to indicate to the system that images have been uploaded and user profile information has been entered prior to the system commencing any processing of any of the images.

Figure 23:
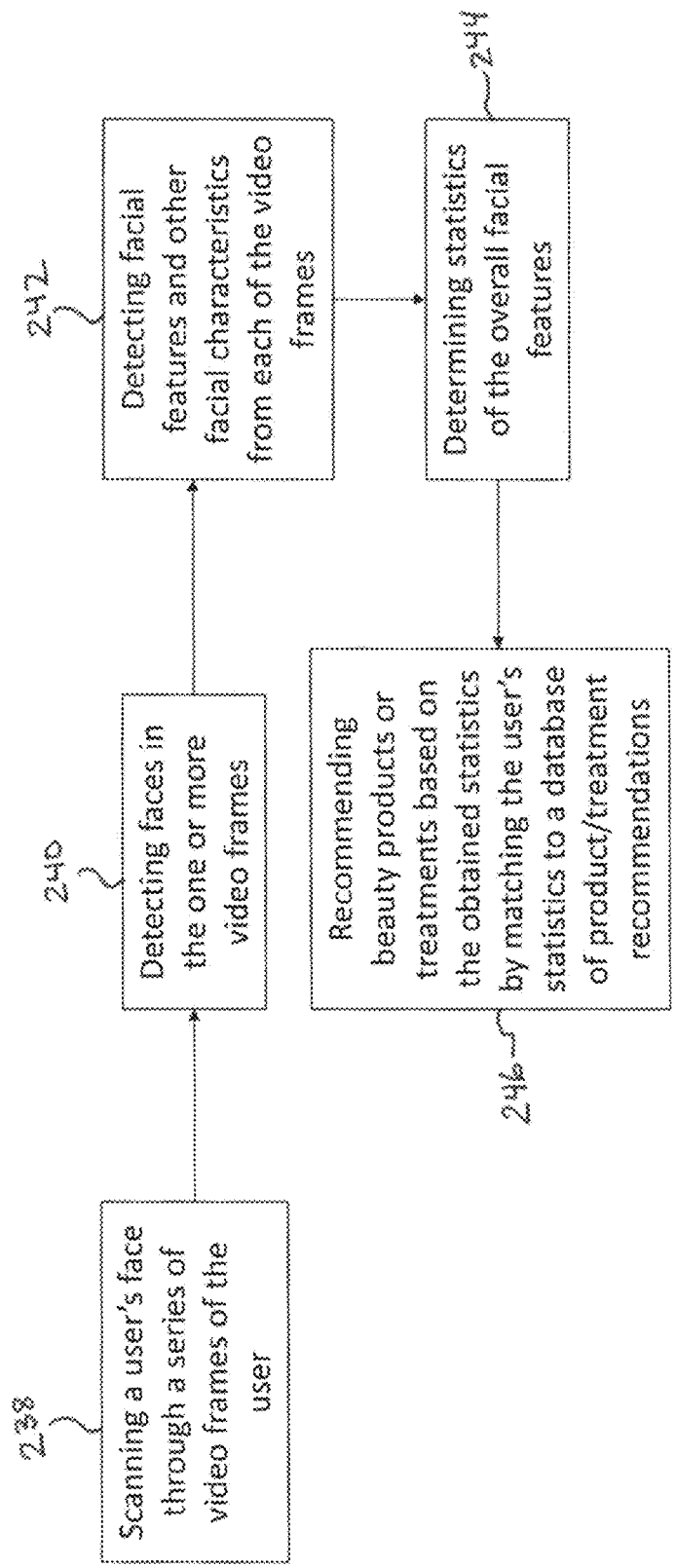
FIG. 23 illustrates a flow chart of an embodiment of the invention that utilizes video to recommend beauty products or treatments.

An example of the process that the present invention applies to uploaded video is set out in FIG. 23. These steps show an example of use of the system that involves the video provide by the user to the system showing the face of the user. It is also possible for the present invention to receive video that shows a person who is not the user.

The system will scan a series of video frames (238) to identify a user's face and multiple frames that incorporate the user's face. The system will detect the faces in each of the video frames (240). The system will then detect facial features and other facial characteristics in each video frame (242). Statistics for each video frame and for the video frames collectively will be determined by the system (244). The statistics will be utilized by the system to determine particular products or treatments to be recommended to the user (246). This, determination involves matching the user's statistics to a database of product and treatment recommendations.

The database of product and treatment recommendations incorporates information relating to each product and treatment. This information, can be used by the system to indicate which product/treatment is applicable to a person on the basis of the certain statistics. Thus, once the statistics relating to the person shown in the video frames are determined the person relevant statistics can be matched to statistics relevant to products/treatments. Based upon a match the product/treatment will be identified as potentially relevant to the person. As multiple user statistics may be generated by the system relating to the video frames showing the person, then the system may identify products/treatments that have a high number of matches based on statistics of the images and to product/treatment. Based upon the number of matches with a product/treatment, one or more products/treatments may be recommended by the system to a user.

The number of products/treatments recommended to a user may be determined by the system in a variety of manners. As one example, the number of products/treatments to be recommended to a user based upon photos may be set, so that only the number of products/treatments having the highest matches upto the set number of products/treatments to be recommended to a user will be recommended to a user. As another example, the system may recognize the products/treatments that have a particular match rate, such as a match of all statistics, or a match, of a percentage of number of statistics, or a match of a particular set of statistics, and only recommend the products/treatments that meet the threshold of match rate, percentage, or set of statistics to the user. A skilled reader will recognize that there are other possible means whereby the system may determine whether one or more products/treatments will be recommend to a user.

Additionally, some products/treatments may be indicated in the database as being related to each other, in a manner whereby when one product/treatment is recommended to a user then another product/treatment must also be recommended to a user. For example, a particular shampoo hair product may be best used with another particular conditioner hair product, and this is indicated in the product/treatment database, so that the system will recommend both the shampoo and conditioner hair products in combination to a user.

If multiple products/treatments are to be recommended to a user the products/treatments may be recommended as a group, or may be recommended individually in sequence to the user. Should products/treatments be recommended as a group, the present invention may be operable to product a post-application image that shows the effects of the application of multiple products/treatments to a person shown in an image.

As shown in FIG. 25, the present invention may offer selection options to a user, whereby a user can select a category of product/treatment focus, such as products/treatments for the face, relating to aging, relating to make-up, or relating to hair. Once a category is elected by the user then the system may solely display statistical information and/or product/treatment recommendations relating to the specific category selected by the user. In the display (162) of FIG. 25, the category options selectable by a user are provided to a user at the bottom of the screen, but a skilled reader will recognize that the screens displays shown in the drawings are merely examples, and the displays can be configured in a variety of manners in accordance with the present invention.

A skilled reader will recognize that multiple pages (webpages or App pages) maybe generated to be displayed to a user to incorporate the statistical and recommendation information to be displayed to a user, as well as any other information and/or images to be displayed to a user, such as any post-application image.

The initial steps of the present invention are to receive one or more images from a user and to process these images to detect features, such as facial features, and other aspects of the images, as described herein. The processing of the images will involve processing of the individual images, as well as processing that incorporates all of the images. A variety of steps may be implemented by the system to process the images individually and collectively. The processing of the images individually and collectively will generate data, including statistical information relating to the individual images and the collection of images. This statistical information, or portions thereof, can be displayed to the user.

In one particular aspect of the present invention, the method and system utilizes computer vision and machine learning algorithms in order to detect these features. In the case of the face, this consists of matching a probabilistic face model, or a face template, to the various locations of the digital image in order to find the most, probable location of the face, as illustrated in the examples provided below. This action is performed at multiple scales and in a hierarchical fashion in order to detect different face sixes as well as increase the efficiency of the computations. Pre-computations such as detecting specific skin-like colors in an image can be used to speed up the operation even further.

The core algorithm for face detection can be implemented in software or is custom hardware (e.g., field programmable gate arrays or very large scale integrated circuits). The methodology for efficient face detection and localization on field programmable gate arrays has been described, for example, Nguyen, D., Halupka, D., Aarabi, P., Sheikholeslami, A., "Real-time Face Localization Using Field Programmable Gate Arrays", *IEEE Transactions on Systems, Man, and Cybernetics,* Part B, Vol, 36, No. 4, pp. 902-912, August 2006. This particular face recognition technique consists of a block by block implementation of the face searching system in digital logic running on a field programmable gate array.

Figure 6A:
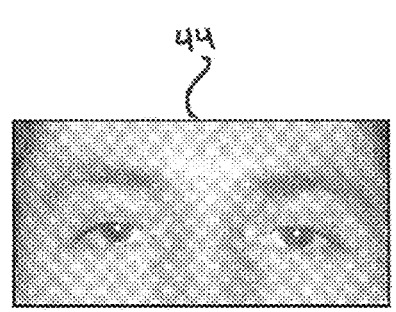
FIG. 6a, FIG. 6b, FIG. 6c and FIG. 7 illustrate feature detection steps for eyes.
Figure 6B:
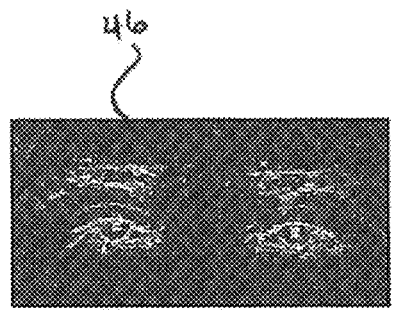
Figure 6C:
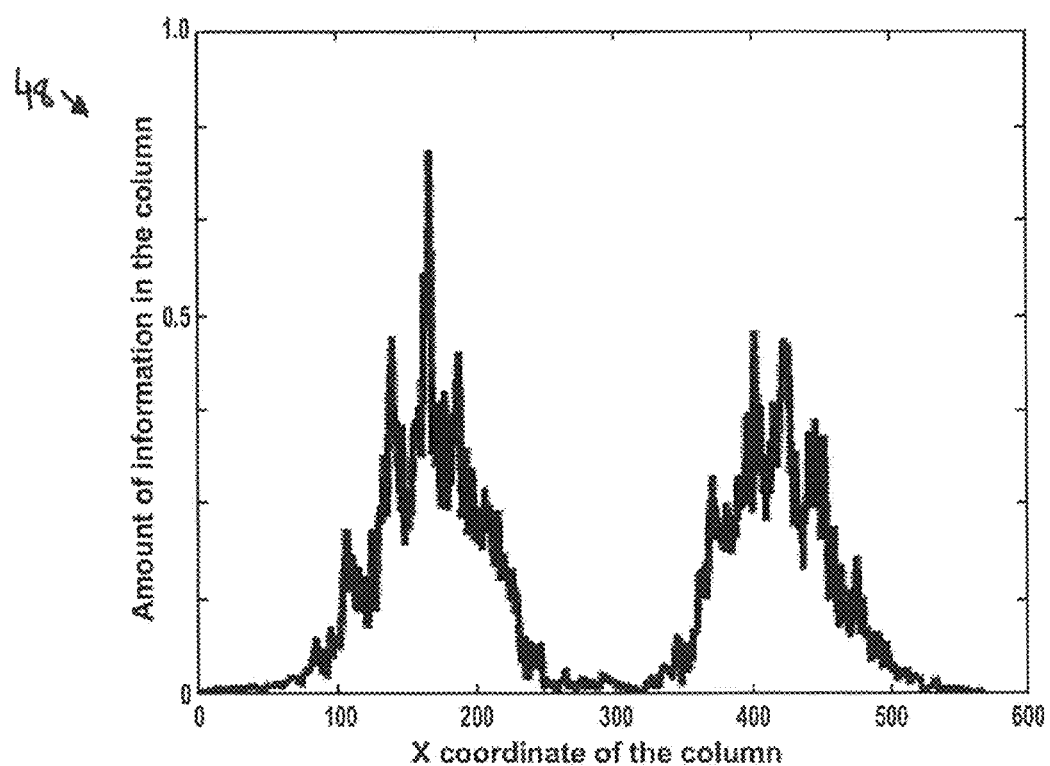
Figure 7:
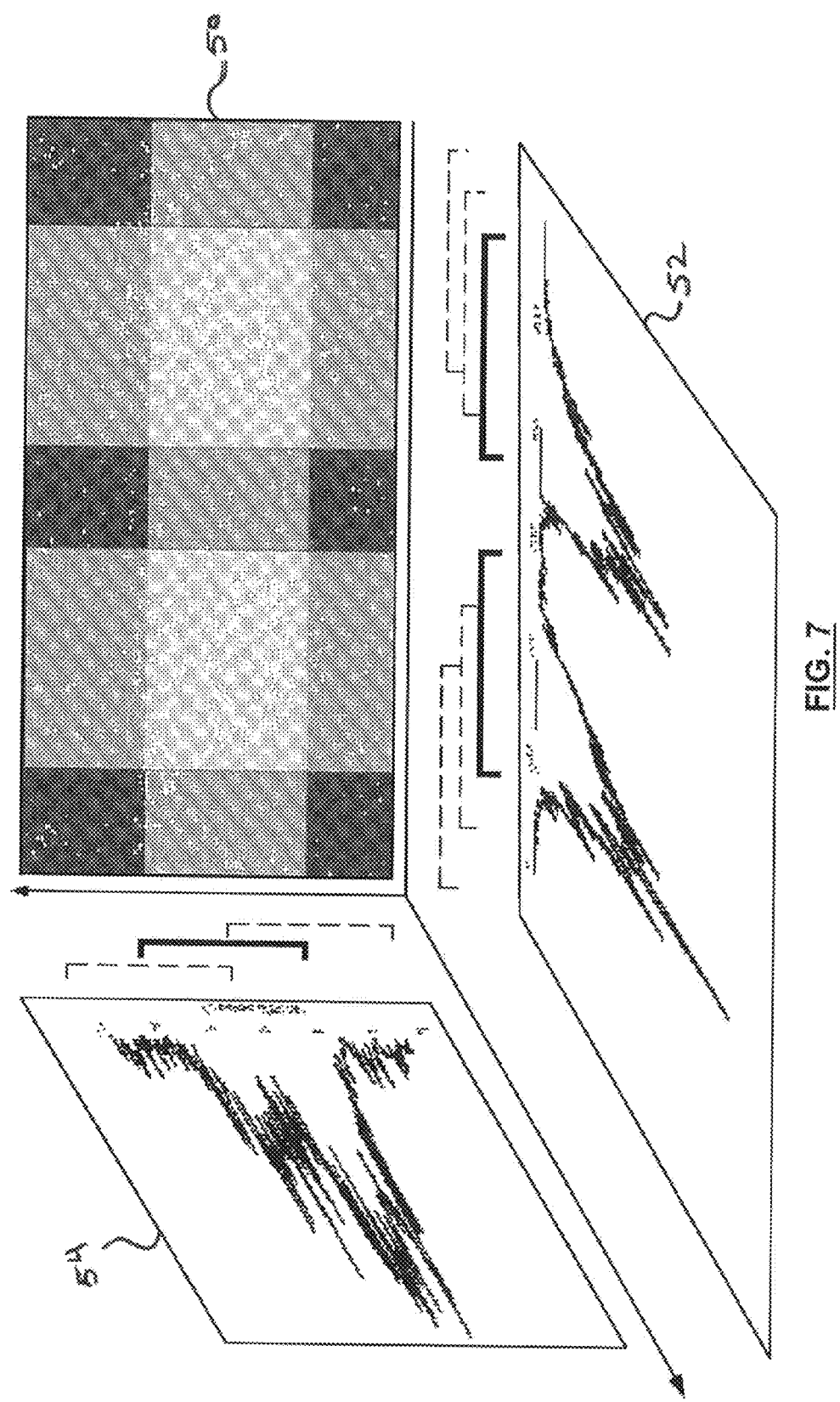

The detection of the features such as eyes, nose, and lips is performed as follows, in one embodiment of the present invention. First the located face is divided up into regions of interest which may contain the eyes, nose, and lips. These regions may be overlapping. In the eye region, the image intensity gradients of the region are extracted and the region with the largest intensity gradients within an eye template is selected as the eye location (44, 46), as shown in FIGS. 6a and 6b. This information may be utilized by the present invention to generate a histogram or other statistical format relating to the gradient intensity (48, 54, 52, 50), as shown in FIG. 6c and FIG. 7. The size of the eye template is proportional to the size of the detected face. The same highest gradient oval detection is performed on the right half of the region. The resulting highest-gradient ovals are used as the presumed eye locations.

The lips are detected next by a similar procedure, where the region with the largest edge gradients within a lip template is selected as the lip.

The location of the nose is determined based on the positions of the eyes and the lips. The nose will have a bottom that just slightly overlaps with the lips, a top that touches the edge of the eyes, and a width that is in proportion to the face.

Feature Detection

Figure 16:
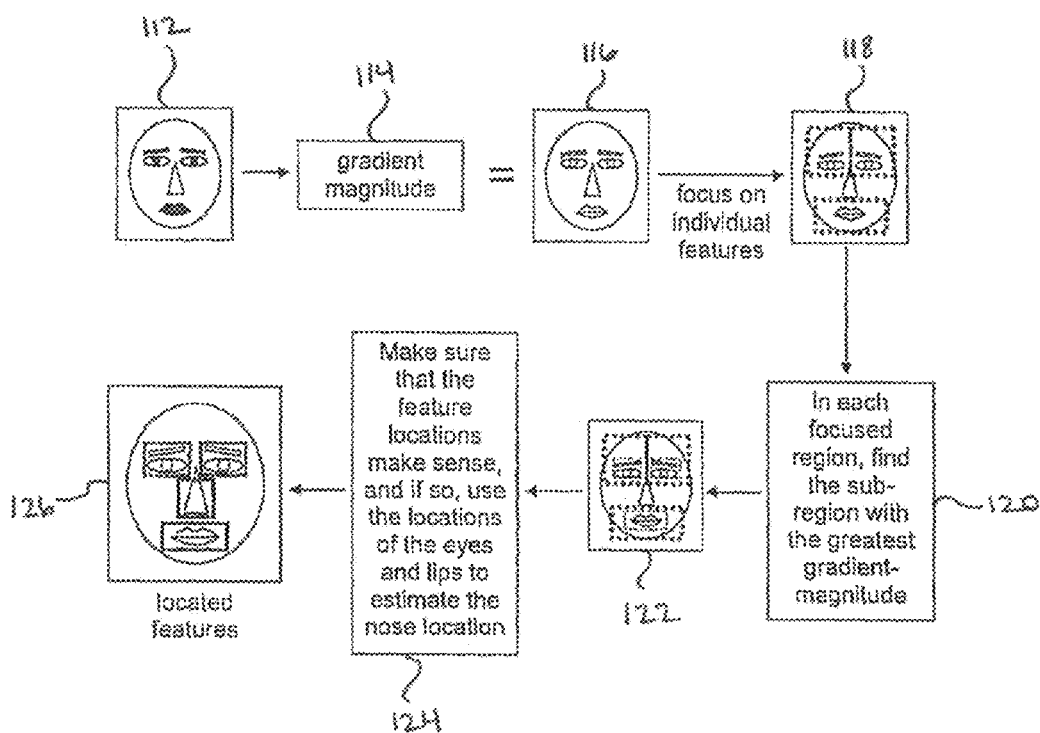
FIG. 16 illustrates the process of feature detection.
Figure 26:
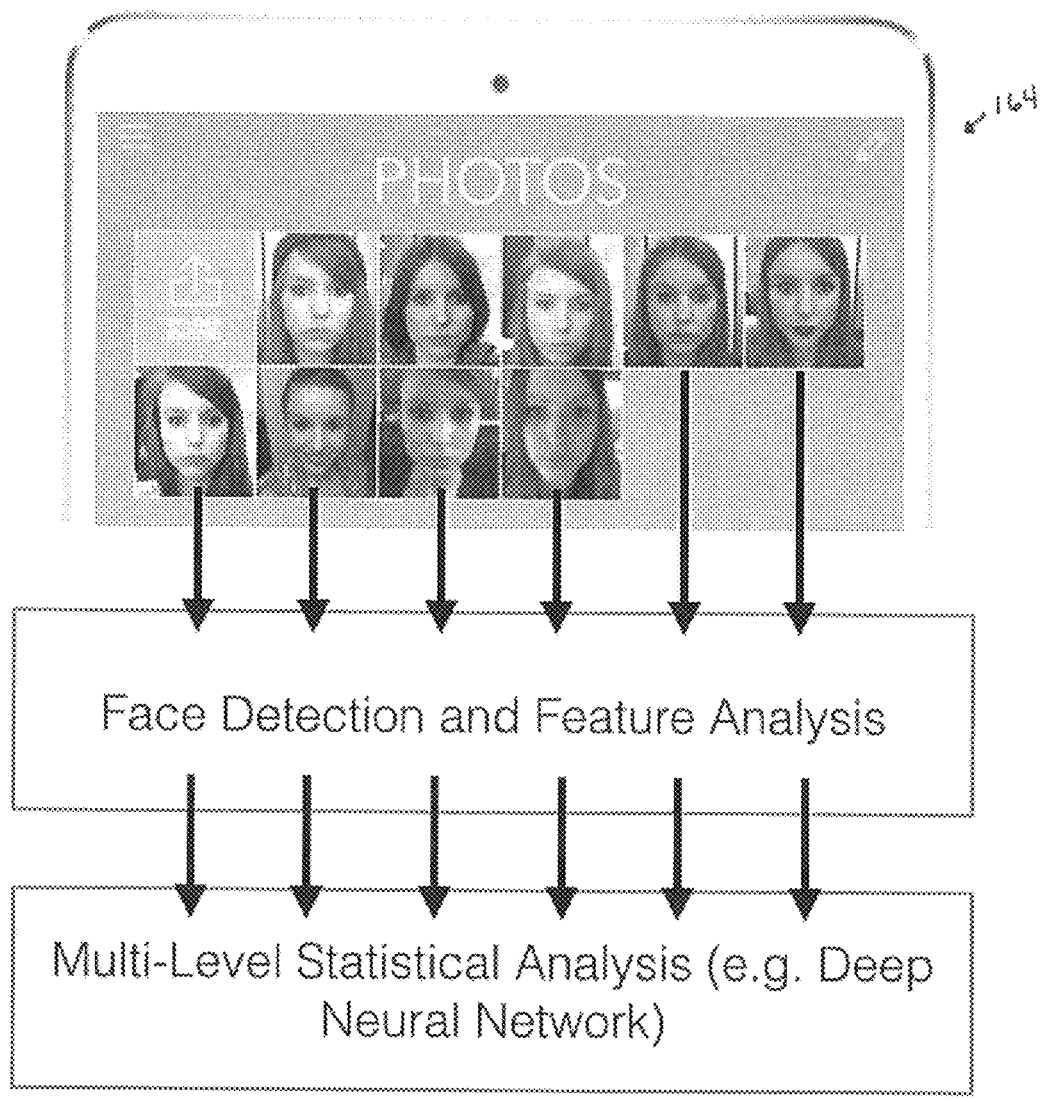
FIG. 26 illustrates an embodiment of the present invention that utilizes multiple images for face detection and feature analysis and multi-level statistical analysis.

The main facial features (lips and eyes) are detected (112) by the following set of steps, an example of such steps is shown in FIG. 16:

1. The gradient magnitude image of the face is obtained (114) (this is done by subtracting each pixel from the pixel just above it, or, from taking the square root of the square of the vertical pixel difference plus the square of the horizontal pixel difference).
2. We focus on the specific locations of the face (116) where we expect to find specific features (118).
3. A search is conducted to find a small sub-region (120) (the sub-region size is chosen in proportion to the face size) within each focused region such that the total gradient magnitude in each sub region is maximized. Please note that usually this summation is done on a weighted basis using an appropriate feature mask.
4. Once the lip and eye locations have been found (122), And system will make sure that the feature locations make sense, and if so, use the locations of the eyes and lips to estimate the nose location (124), so that the nose location is estimated (126) as follows
    a. $Nose_{13}height=0.4*face\_height$
    b. $Nose\_width=0.4*face\_width$
    c. $Nose\_left=(eyes\_horizontal\_mid\_point+lip\_horizontal\_mid\_point)/2-Nosewidth/2$
    d. $Nose\_top=(lip\_top+lip\_height*0.3-Noseheight)$ As shown in FIG. 26, once face detection and feature analysis is performed by the system for each image (or video frame) provided by the user to the system, the system may perform multi-level statistical analysis. The face detection, feature analysis and statistical processing of the present invention occurs within the system and is not displayed to the user during the processing steps. During processing and analysis the user may see a display that shows the images that the user has provided to the system and other screen display content, as shown in example screen 162. As described herein, the results of the processing and analysis, or portions, thereof, may be displayed to the user once the processing and analysis are complete.

The present invention is operable to generate a variety of types of statistical information relating to individual images and to the images collectively. These statistics may be generated based on focusing on portions of the images, such as focusing on a skin portion of an image to produce statistics relating to skin tone in an image, and statistics relating to skin tone for the collection of images. The system may determine the gradients of skin tone within an image and the gradient range, as well as average gradients of skin tone derived for a collection of images. For example, to determine skin tone statistics information such as the red-green-blue (RGB) values of the image may be detected by the system and analyzed in relation to skin color. A skilled reader will recognize that a variety of types of statistical information can be generated from an analysis of the individual images and collection of images.

The system may utilize threshold information in its analysis of each individual image as well as of the images collectively. For example, a threshold relating to RGB in a photo may be acknowledged by the system and the RGB of an image or an average RGB for a collection of images may be compared to an RGB threshold to determine if the RGB of an image or a collection of images is above or below the threshold. Depending on the nature of the threshold the system will recognize that details of the images or collection of images that fells above or below the threshold, have certain attributes, and will be able to communicate this information to the user through the display of the statistical information. A threshold can be hardcoded into the system, or may be generated through use of the system overtime, can be set by a system administrator, or can be accessed by the system from a location external or internal to the system, such as an Internet site, or a storage means, such as a database or a server.

Many aspects of individual images may be analysed within, an image, such as existence of particular colours, the gradient of colours, the intensity of colours, the pixel size, certain portions of the image (such as skin portions, or hair portions, or the area surrounding an person in an image (which may provide information such as brightness of the environment when the image was captured that can affect the display of skin tone and other features of the person appearing in an image), or any other portion of an image).

Analysis of the images collectively may involve determination of averages relating to aspects of all of the individual images that were analyzed. For example, average, intensity of colours within the collective images. The analysis may further involve determining ranges of analyzed aspects of the images, or further may involve generating statistics based upon the comparison of the analyzed aspects of the images, or aspects of the images, to certain threshold values, as described herein.

The analysis is multi-level in that it involves analysis of the individual images and the collection of images, and it also involves a variety of types of analyses for each image and for the images collectively. A skilled reader will recognize that a variety of aspects of the individual images and collection of images may be analyzed by the present invention, and that statistical information relating to each of these analyzes may be generated by the system.

In some embodiments of the present invention the system may generate and process votes relating to the image analysis. One or more votes may be generated by the system based on each image and each vote may relate to a certain aspect of the image. For example, a vote may be generated based on the undertone determination relating to each image. Collectively the votes for the images in a collection of images may be utilized by the system to produce an overall average of skin-tone relating to the collection of images. A skilled reader will recognize that vote can be generated by the system relating to other aspects of the images as well, such as an the number of detected skin pixels, or other visual or image-dependent information. The voting mechanism applied by the present invention can be binary or real-valued.

A real-valued voting mechanism may act as a neural network connection. A vote generated by the system relating to each image may be a scaled or ranked vote that reflects a value associated with the image. The votes assigned to each image may collectively provide different input weights depending on the image's score confidence, the votes for aspects of the image (such as the number of detected skin pixels or other visual or image-dependent information detected in relation to each image that is assigned a vote). The votes can be reviewed for a collection of images, and the votes can be utilized to assess the images. For example, the brightest, and darkest coloured images may be discarded by the system based upon the votes relating to the images in a collection of images, to remove outliers. In embodiments of the present invention discarded images may not be incorporated in the analysis undertaken by the system and/or the statistical information that is displayed to the user as user information.

The vote information may be utilized in an analysis by the system along with other analysis data generated by the system. For example, based on the skin, undertone vote, and based on the skin colour average, values for end color and under-tone may be detected by the system, in such an example, the detected end colour and undertone may be reported to the user by the system.

Figure 27:
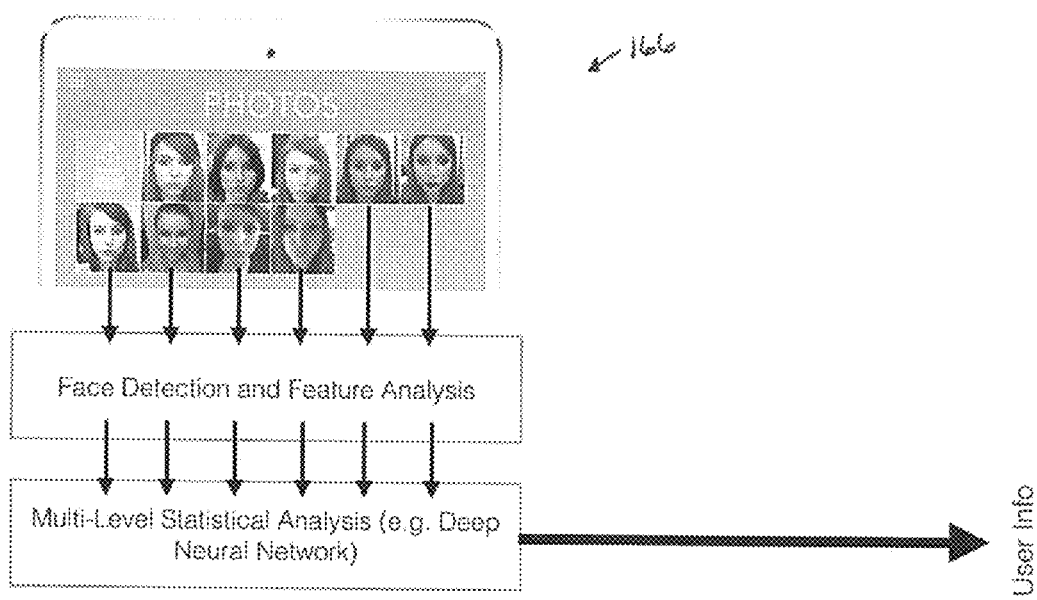
FIG. 27 illustrates an embodiment of the present invention that generates user information based upon a multi-level statistical analysis.

The system may generate user information following processing, and analysis of the individual images and collections of images. The user information may be based on the statistical information and can include other information as well that is to be displayed and otherwise reported to a user relating to the images, and more specifically relating to the person shown in the images, as shown in FIG. 27. The user information may incorporate aggregate and summarized statistical information.

The information and statistics generated by the system from the processing and analysis of the individual images and the collection of images may be further utilized to determine any products/treatments to be recommended to a user. For example, the detected end colour and undertone may be utilized by the system to match specific foundation shades for the purpose of recommending a foundation product to a user.

As another example, if the present invention incorporates analysis relating to aging, a collection of images showing a person may be analyzed by the system to measure the overall health of the person's skin. For example, pore size, blemishes, wrinkles, and other indications of skin health may be determined when the images are analyzed. Based upon the results of the analysis, system may generate personalized skincare treatment recommendations for the person shown in the images to achieve healthier looking skin. The system may also recommend skin-care products, such as anti-aging products, to help the person shown, in the images care for their skin.

In such an example, if the images show the user, the user profile information, such as age or gender user profile information may be utilized to determine the products/treatments to be recommended to a user.

The system may further store information relating to a user's activities during the user's use of the present invention, including use during sessions on various dates and points in time when the user utilizes the present invention. This user activity information, may be accessed and analyzed by the system to identify user preferences, for example, the user's make-up preferences and history may be generated based upon make-up related choices that the user has indicated through it activities relating to use of the system, such as make-up choices indicated to the system. The user's preferences and history based upon the user's activities during sessions of using the present invention may be displayed to the user, and may be utilized by the present, invention in its determination of products/treatments recommendations for a user.

Figure 28:
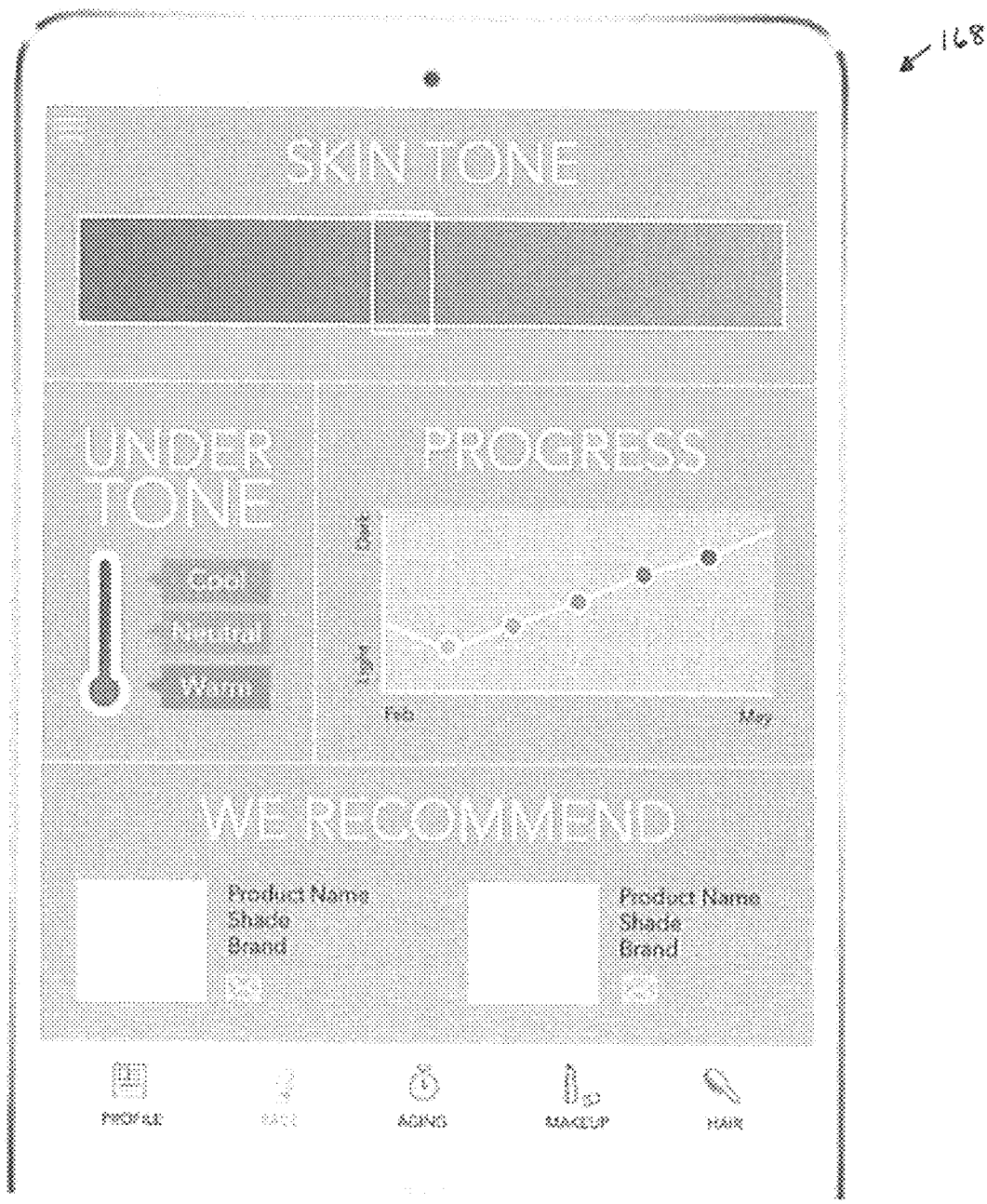
FIG. 28 illustrates an embodiment of the present invention that displays statistical user information and a recommendation of a product.
Figure 29:
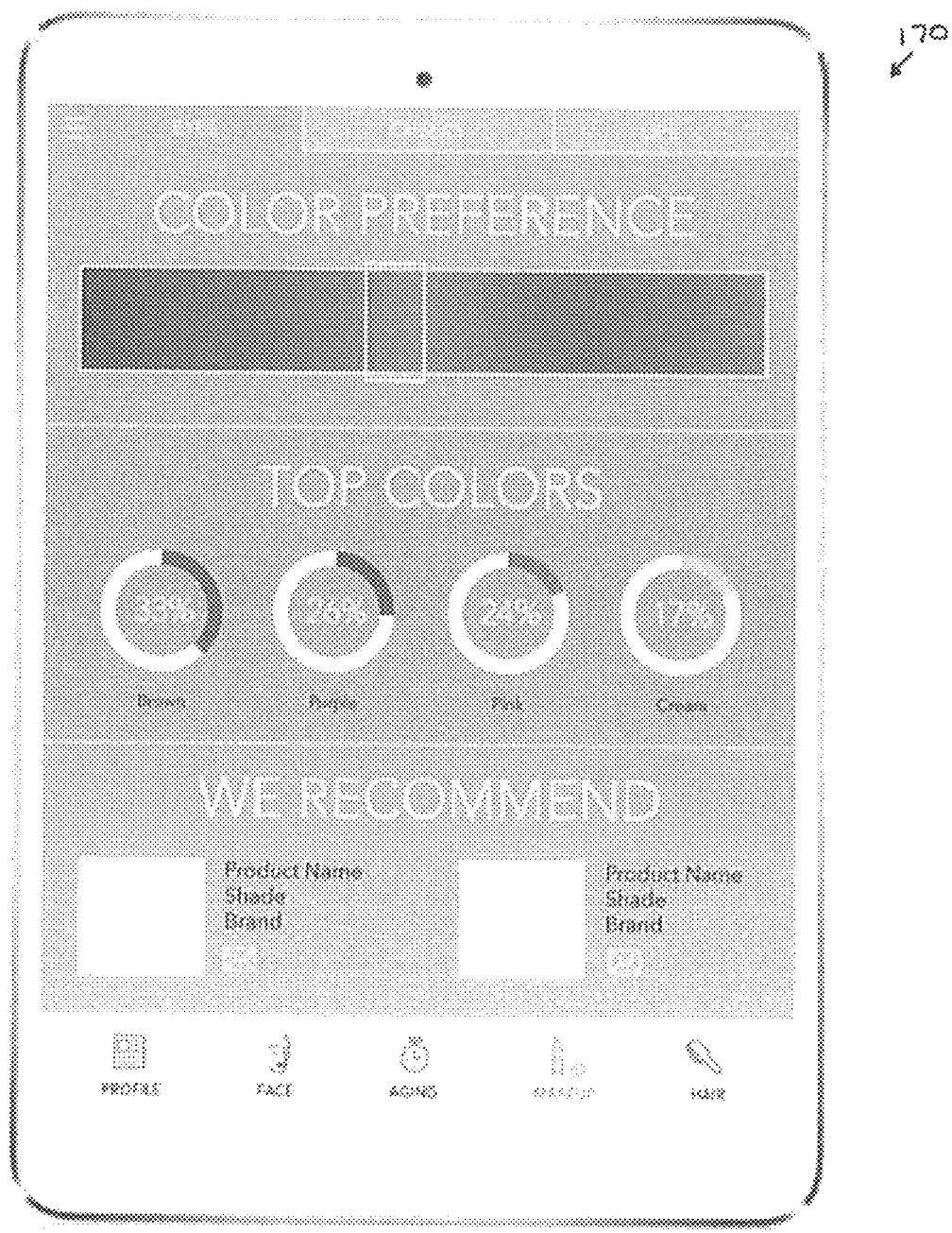
FIG. 29 illustrates an embodiment of the present invention that displays colour information and a product recommendation.
Figure 30:
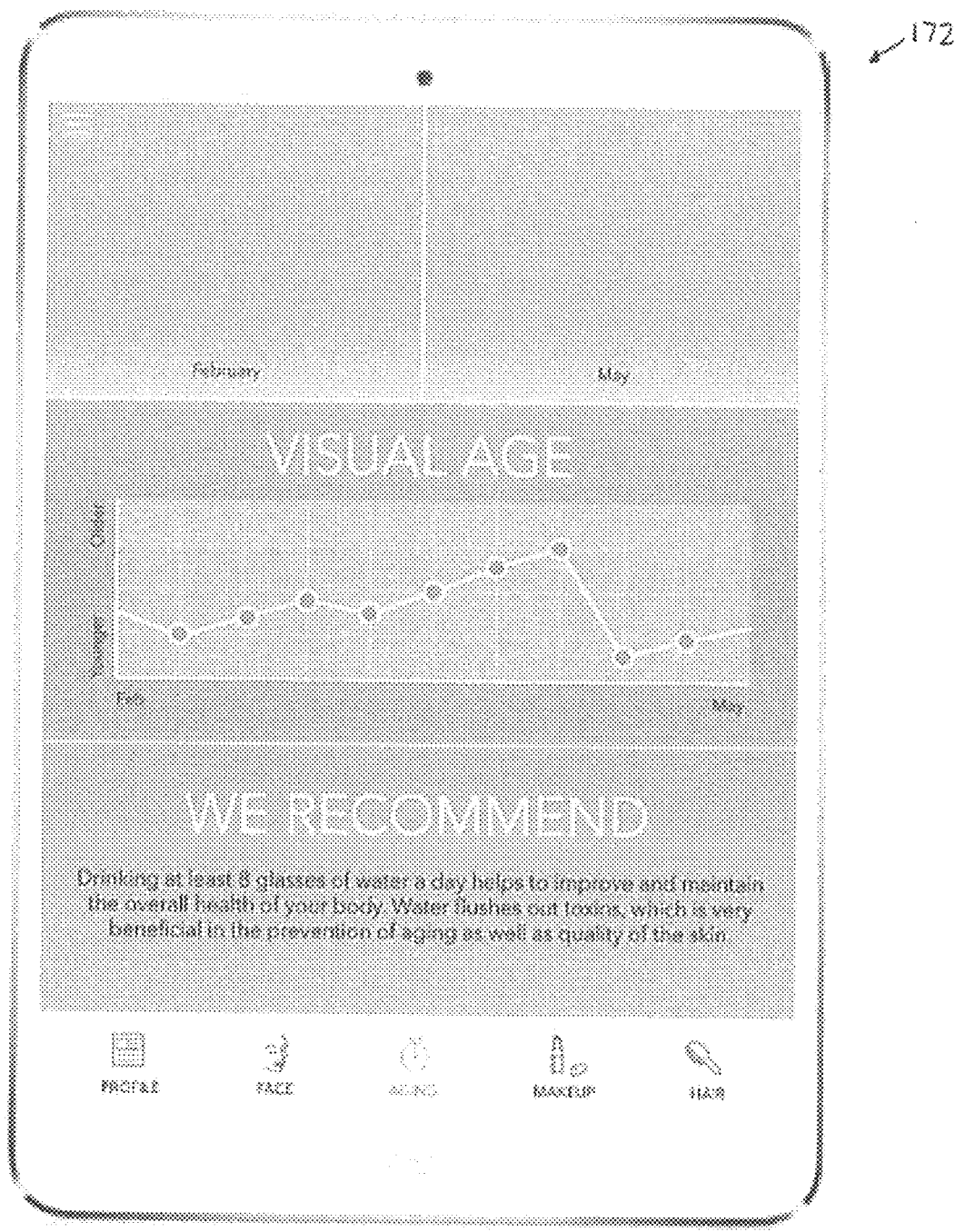
FIG. 30 illustrates an embodiment of the present invention that displays visual aging information and provides a recommendation of a treatment activity.

The user information (based upon the analysis of the images and collection of images, and the statistical information generated from such analyses) may be displayed to the user in a variety of formats, as shown in FIGS. 28-30. The user information screen display (168, 170, 172) may show thermometer indicators, graphs, charts, horizontal or circular range indicators, a spectrum, histograms, or any other display that visually or textually informs the user information. The displayed user information may relate to multiple aspects of the analysis of the images, such as undertone, skin tone, progress shown in images overtime (such as relates to variations in skin colour, hair colour, or other aspects of the person shown in the images over time), colour preference, top colour, visual age, information relating to a particular month (such as skin tone shown in images captured in particular months during the year, or other information). A skilled reader will recognize that the user information displayed may relate to the category selected by the user (such as make-up, aging, hair, etc.), may relate to a particular product/treatment, may reflect types of user information selected by the user to be displayed, or may be chosen by the system based on some other criteria.

The display may include a recommendation of one or more products (168, 170) and/or one or more treatments (172) to a user. The recommendations displayed to a user may incorporate text and/or visual elements.

Displays to be provided to a user may be generated by the system to display information to a user on a single screen or series of screens, and may be organized by category or some other grouping. As examples, as shown in FIG. 28, information relating to skin tone and undertone may be displayed for a user; as shown in FIG. 29, information relating to cosmetics, including information relating to a user's make-up preferences and/or history, may be displayed for a user; and as shown in FIG. 30, information relating to aging characteristics may be displayed for a user. A skilled reader will recognize the variety of information, that could be displayed to a user on screens generated by the system.

Embodiments of the invention may incorporate a system that is operable to perform a variety of steps.

Figure 31:
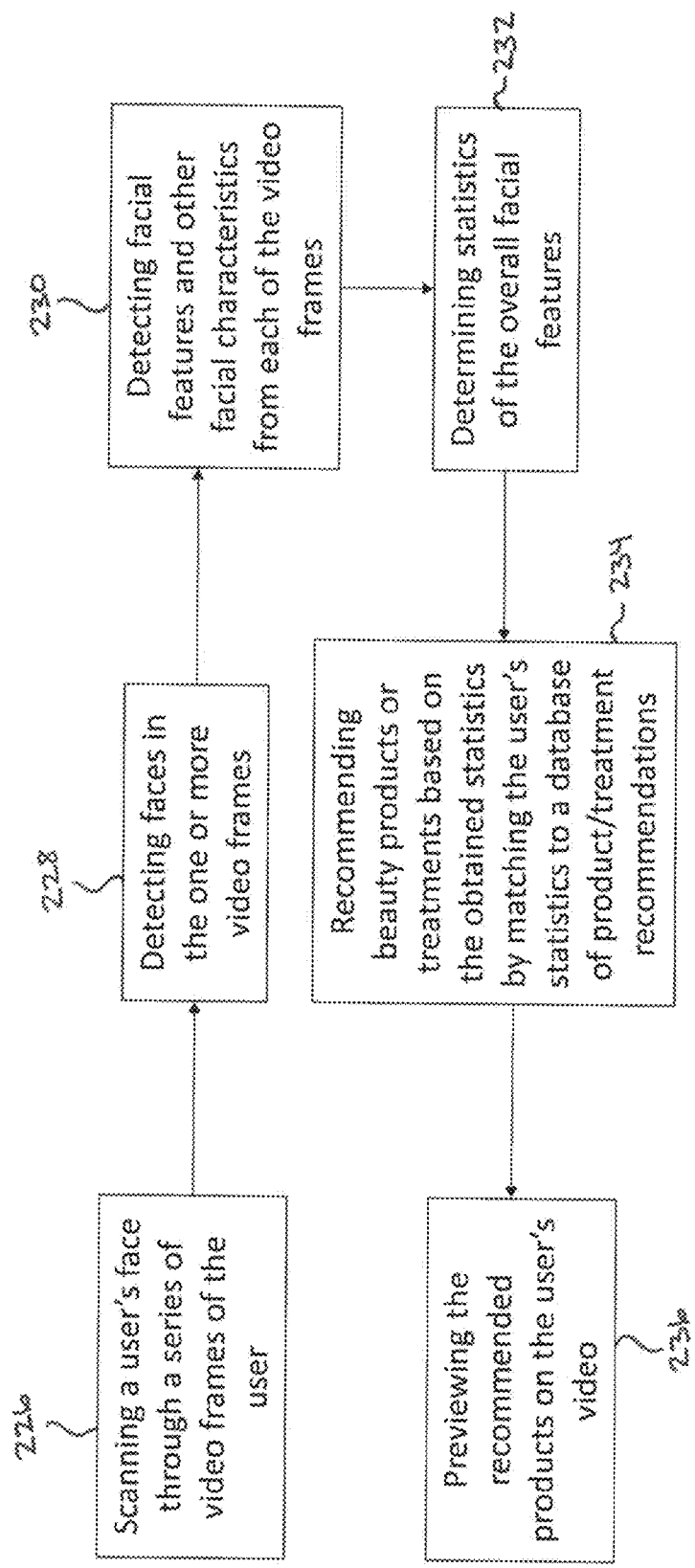
FIG. 31 illustrates a flow chart of an embodiment of the invention that utilizes video to recommend beauty products or treatments and provides a preview of the recommended product to the user.

As shown in FIG. 31, one embodiment the present invention may be operable to scan a series of video frames (226) to identify a user's face and multiple frames that incorporate the user's face. The system will detect the faces in each of the video frames (228). The system will then detect facial features and other facial characteristics in each video frame (230). Statistics for each video frame and for the video frames collectively will be determined by the system (232). The statistics will be utilized by the system to determine particular products or treatments to be recommended to the user (234). This determination involves matching the user's statistics to a database of product and treatment recommendations. The system may preview the recommended products on the user's video (236) as a post-application video (generated in the manner described herein for generating post-application images) that is displayed to a user.

Figure 32:
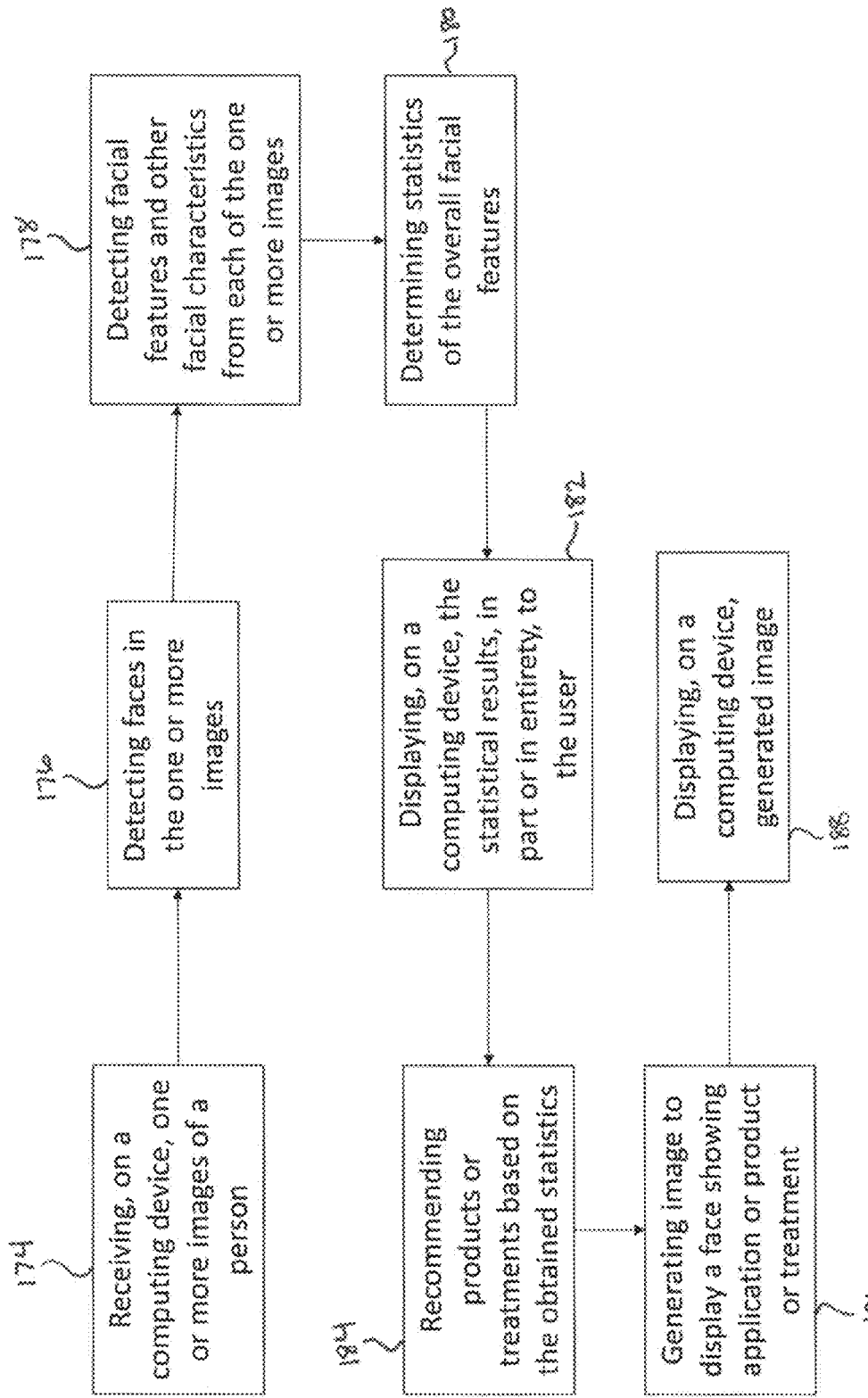
FIG. 32 illustrates a flow chart of an embodiment of the invention that utilizes one or more images to recommend beauty prod acts or treatments and display an image showing an application of a product or treatment.

As shown in FIG. 32, in one embodiment the present invention may be operable to receive on a computing device, one or more images showing a person (174). The system will detect the faces in each of the images (176). The system will then detect facial features and other facial characteristics in each image (178). Statistics for each image and for the images collectively will be determined by the system (180), such as, for example statistics relating to the overall facial features displayed in the images. The statistics will be displayed to a user (182) on the computing device, either in part or in entirety. The statistics will be utilized by the system to determine particular products or treatments to be recommended to the user (184). The system may generate a post-application image (186) that shows the effect of the application of recommended products/treatments to the person shown in the images. The generated post-application image is displayed to the user (188) on the computing device.

Figure 33:
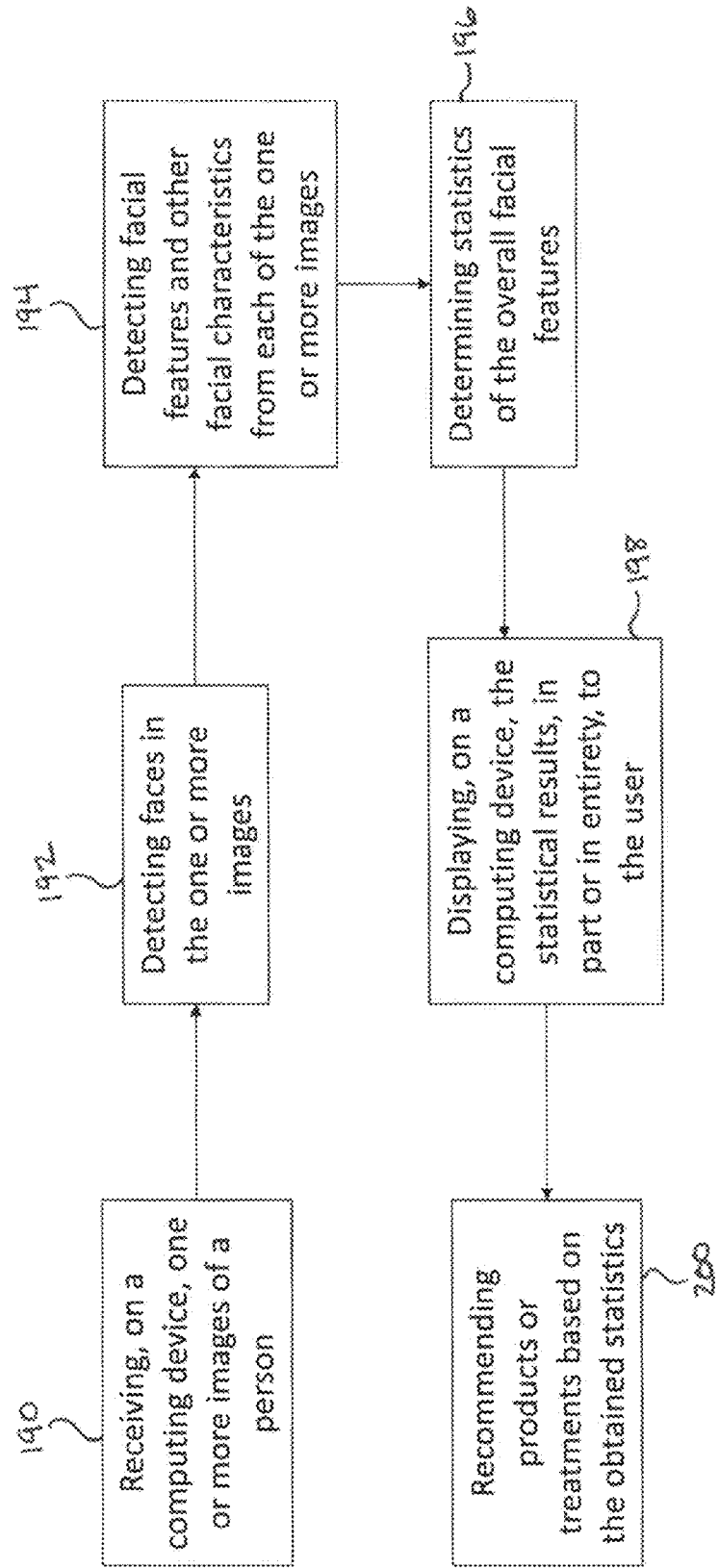
FIG. 33 illustrates a flow chart of an embodiment of the invention that utilizes one or more images to recommend beauty products or treatments.

As shown in FIG. 33, in one embodiment the present invention may be operable to receive on a computing device, one or more images showing a person (190). The system will detect the faces in each of the images (192). The system will then detect facial features and other facial characteristics in each image (194). Statistics for each image and for the images collectively will be determined by the system (196), such as, for example statistics relating to the overall facial features displayed in the images. The statistics will be displayed to a user (198) on the computing device, either in part or in entirety. The statistics will be utilized by the system to determine particular products or treatments that are recommended to the user (200) on the computing device.

Figure 34:
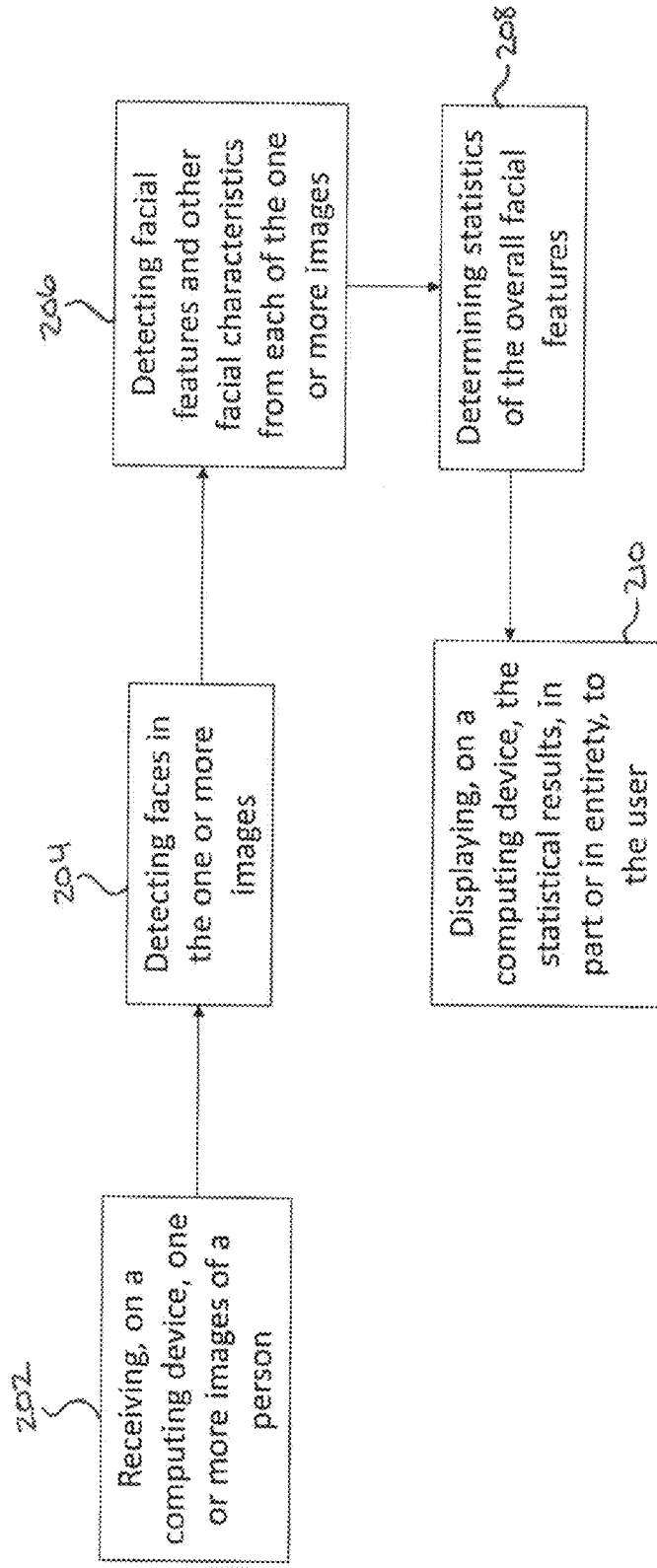
FIG. 34 illustrates a flow chart of an embodiment of the invention that utilizes one or more images to determine statistics and display the statistical results on a user's computing device.

As shown in FIG. 34, in one embodiment the present invention may be operable to receive on a computing device, one or more images showing a person (202). The system will detect the faces in each of the images (204). The system will then detect facial features and other facial characteristics in each image (206). Statistics for each image and for the images collectively will be determined by the system (208), such as, for example statistics relating to the overall facial features displayed in the images. The statistics will be displayed to a user (210) on the computing device, either in part or in entirety.

These are examples of possible embodiments of the present invention and other embodiments are also possible, in accordance with the description of the invention herein.

In embodiments of the present invention wherein the features in the one or more images provided to the system by the user are to be shown in a new post-application image showing the effect of the application of a product or a treatment, any of the following applications may be undertaken to generate the post-application image that will be shown to the user. For example, post-application images may display the effects of the application of a product or treatment such as a skin cream that may smooth wrinkles from the skin surface, the application of a cosmetic product such as foundation whereby the lace is blended and recoloured, the application of make-up whereby specific colour is added to certain parts of a face, treatment to firm skin (such as may have the effect of a facelift), or other effects of product or treatment application. A skilled reader will recognize the variety of post-application images that may be generated based upon the effects of the application of a product or treatment. As described herein, the generation of the post-application image may utilize one or more images or features stored in a database in relation to a particular product or treatment. These stored product/treatment related images and/or features can be blended with any of the images provided by the user to the system.

The possible operations by the system to generate a post-application image that incorporates the required modifications to show the effects of an application of a product and/or treatment are described herein. The system will apply the steps that are required to produce a post-application image that reflects the effects of a product/treatment. These steps may be identified in the information that is stored relating to the product/treatment in the database in some embodiments of the present invention.

The post-application image that is generated by the present invention may be displayed to a user. The post-application image may further be stored in the database and be displayed to the user by the system at later points in time when if is retrieved by the system from the database, such as may occur should the user request to view the stored post-application image.

Generally, the present invention may be operable, once features have been located in an image provided to the system to the user to combine such features with the features from the product/treatment database by blending either a face or facial feature into one of the images provided by the user. Prior to the blending, the feature locations are preferably adjusted to fine tune the previous feature locations and by 'matching' the locations of the features of the face in the image. This matching is done by comparative adjustments to the detected eye, lip and nose locations and slight adjustments to align the gradient intensities of the eyes and lips.

Once the feature locations have been finalized, the desired feature is color adjusted and blended on top of the original feature. For example, for switching the eyes (or nose or lips) of two photos, once the eyes (or nose or lips) have been localized, the eye (nose or lip) from the database (56), as shown in FIG. 8a, is smoothly blended into the eye (or nose or lip) box of the image (58), as shown in FIG. 8b, resulting in new combined image (60), as shown in FIG. 8c.

As used herein, the term "box" should be understood to include any shape suitable to focus in on a region of interest, whether the area of interest relates to the eyes, lips, nose or otherwise. For example, an eye box can be round, square, rectangular, oval, pentagonal, etc.

Figure 9A:
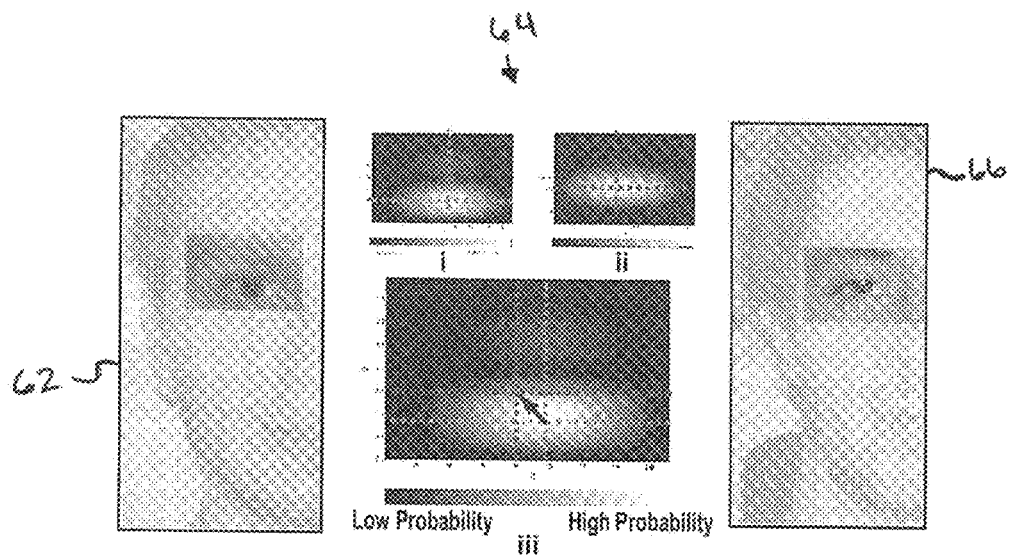
FIG. 9a and FIG. 9b illustrate shifting for eye boxes.
Figure 9B:
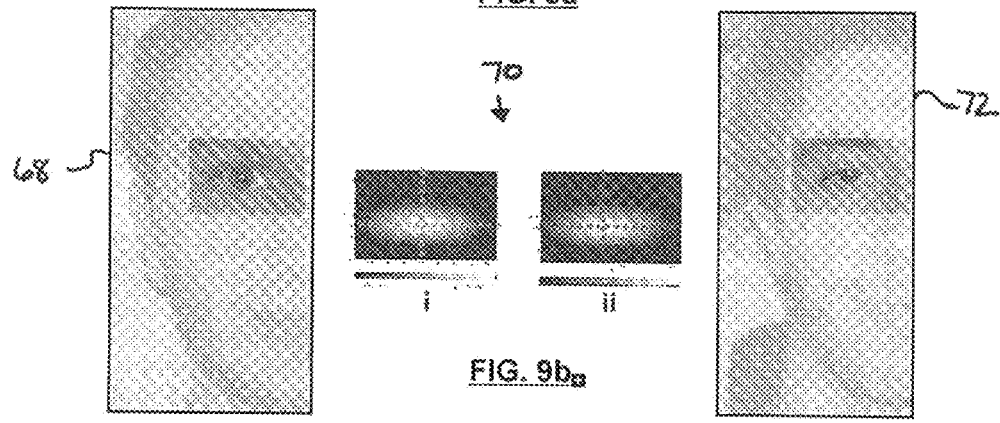

Prior to this blending, the features can be recolored (by performing histogram transformation on each of the color histograms in order to equalize the red, green, and blue average pixel values for each image) to the features' histograms of the previous features (the features which are being replaced). This color transformation is preferably performed when changing the eyes, nose, and lips. In order to improve the level of realism of the final result, the re-coloring is applied mainly using the color values of the outer areas of the features and less so in the center of the feature. For example, in the case of the eye, the inner eye color of the desired eye makes a smaller contribution to the color histograms than the color around the eye. This is further illustrated by FIG. 9a and FIG. 9b with the capture of the color transformation tor changing eyes (62, 64, 66, 68, 70, 72).

Figure 10A:
FIG. 10a, FIG. 10b and FIG. 10c illustrate a final face after replacement, shifting and blending.
Figure 10B:
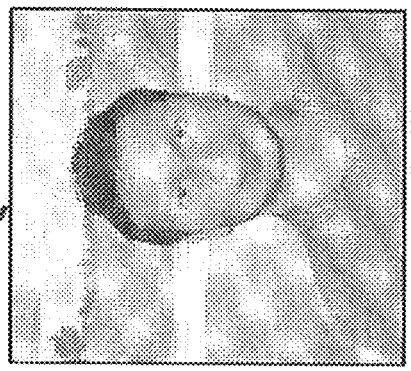
Figure 10C:

Different blending masks can be applied to the recolored areas and original features and the masked layers are then added to result in the final features. The mask shapes for each feature are custom designed for the general shape of the feature. Depending on the mask, the blending consists of gradient filling whose center consists entirely of the first eye (or nose or lip) and whose borders (as defined by the feature mask) consist entirely of the second eye (or nose or lip) box. In between the center and the border, the ratio of the first eye (or nose or lip) and right eye (or nose or lip) gradually changes in order to result in a smooth, contour and smooth blending. Similarly, this blending can be performed for other facial features (or even for the entire face), as requested by the user. This is further illustrated in FIG. 10a, FIG. 10b and FIG. 10c with the appearance of a fees in an image (74) that incorporates a replacement feature from the product/treatment database (76) to form a new image (78) and shifting and blending steps are performed for the new image.

The above achieves the results of exchange of features between selected digital images of faces (i.e., the face in the digital image and features of a face that are stored in the product/treatment database), in accordance with the present invention, which may be utilized to produce one or more images or video that shows the results of the application of a treatment or a product. The results shown could be results at any point in time after the application of a treatment or product begins, or could be the final result after the application of a treatment or product is completed.

As stated previously, another aspect of the present invention is the performance of a virtual facelift or face cleansing/smoothening operation. This is done by first detecting the locations of the eyes, nose, and lip as outlined above, smoothing/lifting the face by blurring it (or, as a more complicated operation, retouching the face) in such a manner that the blurring (or retouching) is most severe in the center of the face and gradually decreasing in intensity further away from the face center, and finally by re-blending the initial (non-smoothed) face features (eyes, nose, and lip) on top of the smoothed face. As a more advanced operation, instead of blurring the center of the face the blurring can be applied selectively to regions such as below the eyes, between the eye brows, and around the lips to simulate customized facelift or facelift product applications.

Outlined below are the specific details of a subset of the procedures claimed in this patent;

Blending

Figure 17:
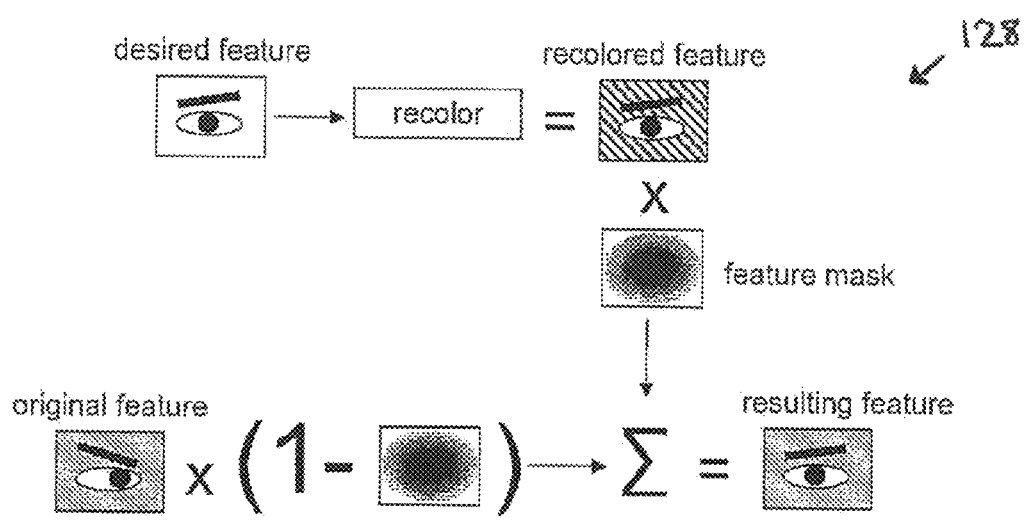
FIG. 17 illustrates the blending process.

The blending of a feature is accomplished through a set of steps (128), an example of these steps is shown in FIG. 17, as follows:
1. The desired feature is recolored to match the color of the original feature.
2. The result of step 1 is multiplied by a feature mask,
3. The original feature is multiplied by the inverse (i.e. one minus each of the mask values, which range from 0 to 1) of the feature mask.
4. The resulting images of steps 2 and 3 are added pixel by pixel to make the final blended feature image.

Recoloring

Recoloring of the desired feature to match the color of the original feature (especially at the boundaries) is accomplished as follows:
1. The weighted average (i.e. weighted mean) of each of the red, green, and blue channels of the original feature are calculated as follows:
   a. A feature color mask is multiplied pixel-by-pixel with each of the red, green, and blue channels of the original feature image; and
   b. The resulting pixel values are summed across each of the red, green, and blue channels, and divided by the total sum of the pixels in the feature color mask—we denote these averages as Or, Og, Ob.
2. The weighted average (i.e. weighted mean) of each of the red, green, and blue channels of the desired feature are calculated as follows:
   a. A feature color mask is multiplied pixel-by-pixel with each of the red, green, and blue channels of the desired feature image;
   b. The resulting pixel values are summed across each of the red, green, and blue channels, and divided by the total sum of the pixels in the feature color mask—we denote these averages as Dr, Dg, Db.
3. The value of each of the pixels in the desired image are modified by added the value Or-Dr to each of the red channel pixels, Og-Dg to each of the green channel pixels, and Ob-Db to each of the blue channel pixels, resulting in the recolored desired image.

Comparative Feature Adjustment

Figure 18:
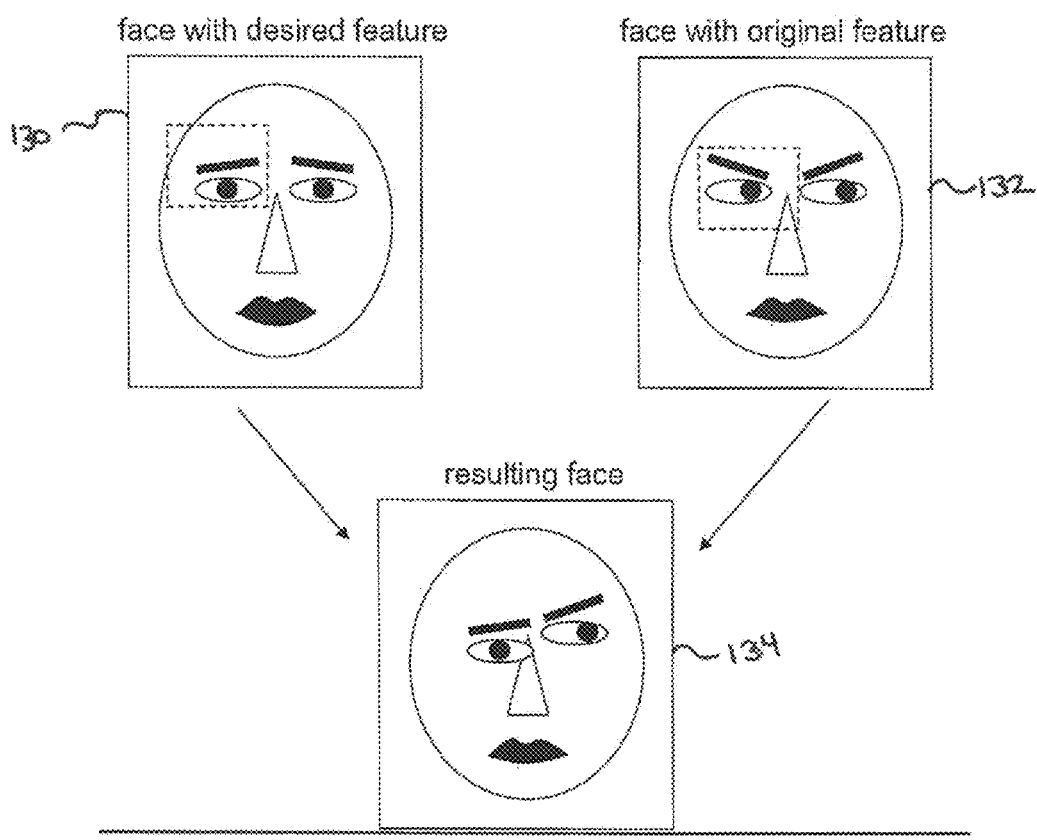
FIG. 18 illustrates the requirement for the comparative feature adjustment.

On certain occasions it is possible to have two feature boxes (one on the original face (132), one on the product/treatment database image face (130)) where both boxes are located correctly but, relative to each other, are not at the same locations on the face. In this scenario, the resulting modified face (134) will have features that will look incorrect. This comparative feature, adjustment situation is best illustrated, in FIG. 18.

Figure 19:
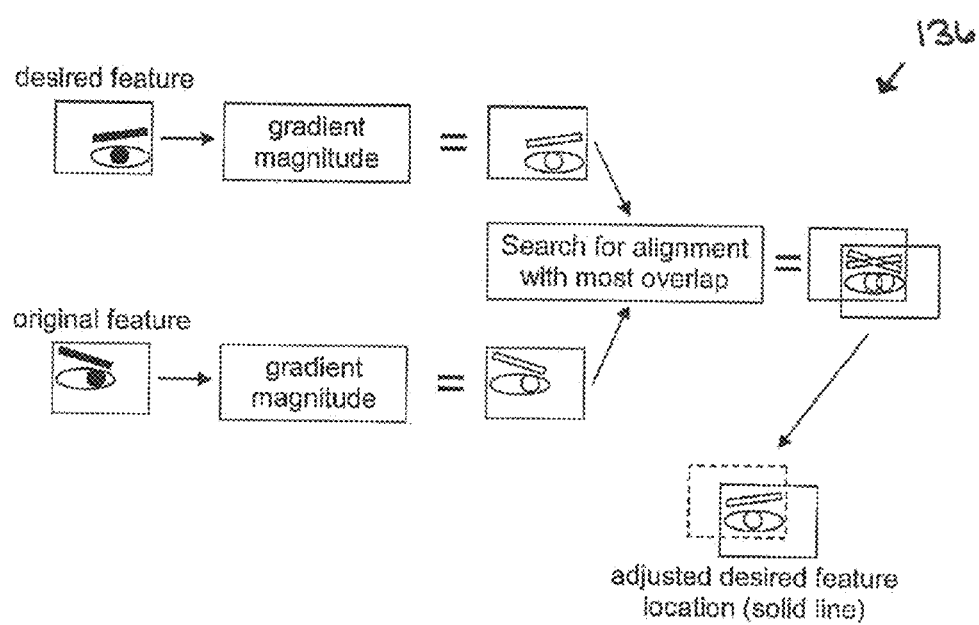
FIG. 19 illustrates a scenario where a comparative feature adjustment is performed.

As a result of a modified face possessing features that appear incorrect, whenever features are being replaced on the original face, a comparative adjustment (136) is performed to make sure that, all features are at the same relative locations, an example of this comparative adjustment is shown in FIG. 19. The comparative adjustment is accomplished by the following steps:
1. Obtaining the gradient magnitude for both the desired features and the original features.
2. Finding an alignment between the two located, features: such that their gradient magnitudes have the highest degree of overlap.
3. Adjusting the feature location of the desired face according to step 2.

Location Adjustment Based on Facial Beauty Scores

The localized features can be optionally processed by a "beauty" filter which utilizes mathematical measurements of the facial features in order to estimate the validity of the features from a classical "beauty" perspective, in a manner that is known. (Aarabi. P., Hughes, D., Mohajer, K., Emami, M., "The Automatic Measurement of Facial Beauty", *Proceedings of the IEEE International Conference on Systems, Man, and Cybernetics*. Tucson, Ariz., October 2001.) If the resulting feature locations are deemed to be outside the range of acceptability, they are modified according to the feature location beauty specifications. For example, if the eye and lip locations represent a highly asymmetrical face, they are slightly modified to produce a more symmetrical face.

Applications and Implementations

As stated earlier, the system of the present invention can be embodied in a variety of ways. For example, the present invention can be implemented through a common website on the World Wide Web, or an App. As stated earlier, this consists of the present invention system being implemented on a computer server (or servers) which takes in user uploaded photos, a set of directives (such as arrows indicating which features and/or face should be included in the final result—as illustrated in FIGS. 2 and 3), processes them as outlined above, and generates the resulting photo for viewing by the user. The system also allows for the user to intervene by adjusting the located lace and facial features, and/or to issue new directives for a new modified result. In other words, the system is initially in a full automatic mode which tries its best to perform the modifications accurately, but allows the user to make subsequent adjustments to refine the results (i.e. hence becoming semi-automatic).

In accordance with one aspect of the present invention, a user first obtains one or more digital images of a face and uploads it to the website of the present invention. The resulting picture is shown with face and feature locations, allowing a user to change locations and repeat the operation.

Another implementation of the system of the present invention involves a user who captures a photo through a scanned image, a digital camera, a camera-phone, and any other device, system, or method of capturing an image, and sends this image (through email, a website, text-messaging, or other mobile, wired, wireless, or method for communication) to a central server of the present invention (e.g. web server (100) illustrated in FIG. 1b) along with a set of directives about what modifications should be performed. This server then automatically performs the requested operations as outlined above, and sends the resulting photo and photo parameters (such as the locations of the face and facial features) back to the user through email, text-messaging, or any other wired or wireless means of communication. There can be further user intervention at this point, such as adjusting the feature locations or directives, and this would result in another iteration of the adjustments and photo sent to the present invention server and the results sent back to the user.

Other implementations of the present invention include kiosks located in malls or stores, for example, or other location which can capture a photo of an individual and perform the operations of the present invention as requested by that individual, allowing intervention and adjustments as described above. In this scenario, the present invention system could either be external to the kiosk, or internal which would allow the device to operate independently.

Another implementation of the present invention is as a stand-alone or server-based kiosk. This system, in either the stand-alone or server-based modes, would consist of a stand, a keypad or keyboard or a set of buttons, a display (possibly a touch screen for easier operation), as well as a camera mounted on the top. The camera captures images of a user standing in front of the kiosk and displays their image along with any requested modifications, on the kiosk display, using the approach described above.

This approach could even be extended to mobile phones and handheld computers as well as digital cameras, which, can contain mobile versions of the present invention system for direct utilization by a user. In this scenario the present invention system would be embedded (running on a custom chip or as part of the device system itself) in the device directly, without the need for external communication.

An alternative to mobile implementations is a custom, developed electronic device which is operable to capture user photos and perform face modifications by uploading photos to it or by means of an onboard camera. This device or digital pad would allow all of the modifications to be performed without the need for external communication.

As mentioned above, the present invention can also be implemented as a web service, whereby face detection and/or face modifications are carried out on digital images and the location of the detected face and facial features and the likelihood that the submitted images contain faces (i.e. the face score) can be remotely returned to a user.

The present invention can be extended to searching, filtering, or processing the results of a visual search query submitted by a user to a database or web search system, such that the images are sorted based on their likelihood of containing a face. In this particular embodiment of the present invention, the visual search query would rely on the techniques described herein for analyzing a digital image to determine whether there are facial features, and if facial features exist, determining their likely location within the digital image.

The present invention can also be extended to conduct face detection and face feature extraction and replacement for forensic, investigative, or other police/security applications.

The present invention can also be extended so that face detection and face feature extraction, and replacement is used for online, mobile, or handheld gaming applications, e.g., a game whereby a user has to guess the name of the original face from which each feature comes from.

The present invention also includes using face detection and face feature extraction as well as face modification (such as facelifting) for targeted cosmetic advertisement and beauty suggestion purposes, such that, cosmetic or beauty advice given is generated automatically based on the facial features and facial characteristics of a submitted digital image.

Extension to Videos

In the application of the present invention to videos, to produce a post-application video, a video segment of a user can be selected for modification and a target photo or video would be selected from the product/treatment database with a with a set of directives about which feature to include from either video. Here, the present invention method and system would be applied on a frame by frame basis, which would then be improved by means of video tracking to fine tune the located features. Video tracking in this situation can resolve occasional errors in the location of the detected face and facial features by utilizing the relative continuity of the video frames.

For this, the input to the video present invention system would be one or more videos as well as a set of directives. The output of the system would be a video with the modified features of the input video(s) and with the tracked feature locations which can be modified tor further modification iterations, as in the previous cases.

Hair Transformation

Figure 4:
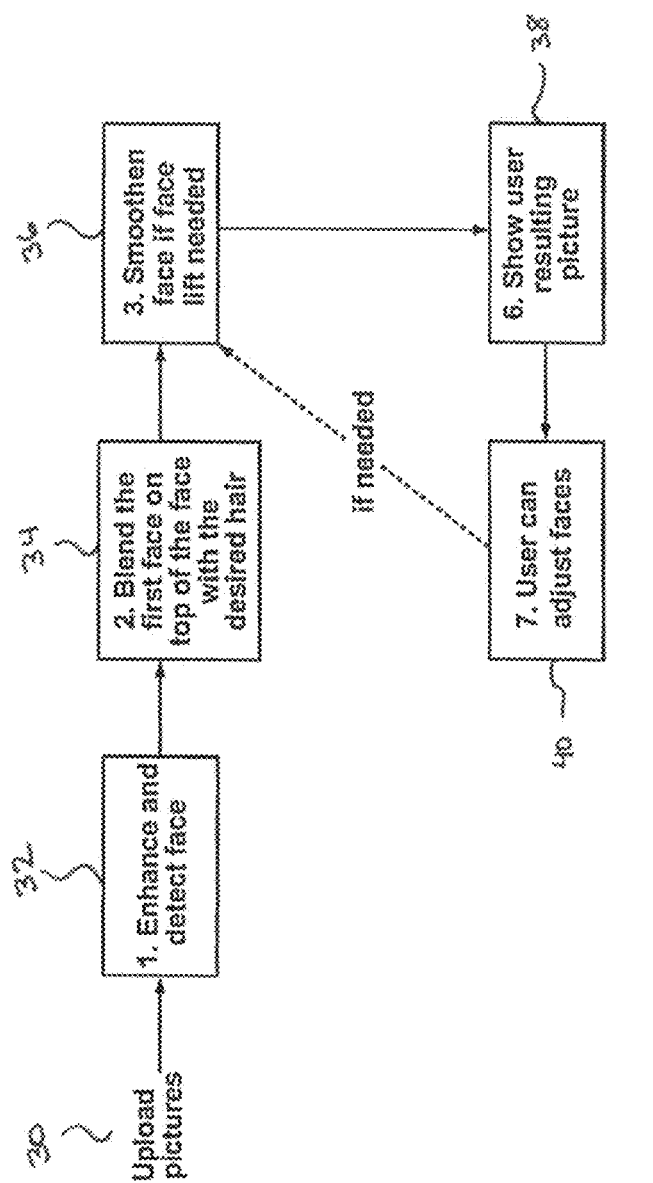
FIG. 4 illustrates a flow chart of method steps of a hair transformation aspect of the present invention.

Another aspect of the present invention is a hair transformation or restyling technique. In one aspect of the present invention, this feature is part of the system of the present invention. If utilizes uploaded images (30). Hair transformation and restyling is also achieved in a manner similar to the facelift. This is accomplished by extracting the face (32) from the product/treatment database and blending it on top of the face in the image (34). The face may be smoothed (36) if a face lift is required. In order to improve the effect, the size of the blended faces should be slightly (e.g., 10 to 20%) larger than the actual size of the faces to yield the best hair restyling result. Also, the bottom of the virtually transplanted face should be extended (e.g., 30 to 100% of the face height) in order to capture the neck, jaw, and chin structure of the desired face in the new photo. The new photo can be displayed to the user (38). Once the hair has been restyled, the user can fine tune the results by adjusting the new photo (40), to adjust face size and locations in either photo and repeating this procedure. The basic method for the automatic hair transformation and restyling is depicted in FIG. 4.

Eyebrow Modification

By using the knowledge about the location of the eyes of a face, the location, of the eyebrow can be assumed to be directly above the eye. This allows the eyebrows of one photo to be placed in the place of the eyebrow of a second photo, as follows:

1. The faces in each photo (one being an image uploaded by the user, the other being obtained from the product/ treatment database) are detected, manually or automatically, and enhanced by performing a partial histogram equalization.

2. The features of the face including the eyes are localized automatically or semi-automatically.

3. If the user has elected to do so, the desired eyebrow box, defined as the box directly on top of the eye, belonging to the first photo is blended on top of the eyebrow box belonging to the second photo. This blending is performed as before, when a blending mask being used to define the amount of the original eyebrow, the desired eyebrow, and the recolored and desired eyebrow.

As described above, user adjustments of the feature boxes can be allowed to fine tune the locations of the features. In the case of the eyebrows, moving the eye box will adjust the locations from which eyebrows are extracted and where eyebrows are placed.

Utilization Within a Social Network

Figure 5:
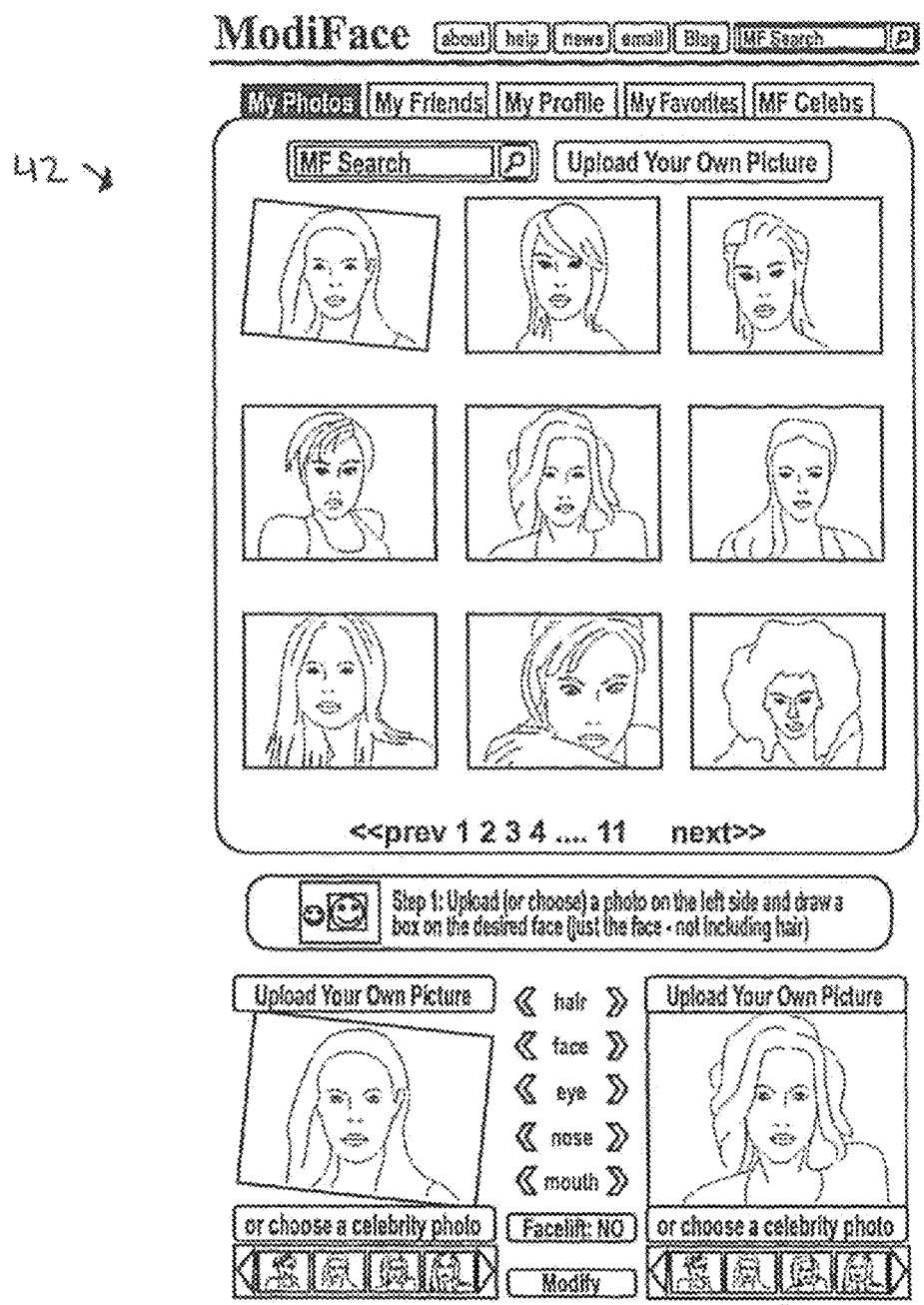
FIG. 5 illustrates a further interface for the system of the present invention, in accordance with one particular embodiment of the present invention.

An example of an interface for the face modification social network (42) is illustrated in FIG. 5. As shown therein, a relatively large image selection area is provided, in this case operable to display 9 images, and with controls to allow a user to flip between different "pages" of images. Towards the bottom of the screen an image selection area is provided to allow the user to easily select images to be processed and analyzed by the system, as described herein.

Dynamic Images

Another application of the present invention is that of dynamic images. Currently, an image for Internet applications is a static file stored on a server. The present invention is operable to generate dynamic images of a person's face, such that certain elements of the image changes on a monthly, weekly, daily, hourly, or any other time-based or request-based changing schedule. Such as to reflect application of products/treatments overtime. For example, a user may upload their own photo and they would get a link to a version of their photo that dynamically is modified over a time interval.

Three Dimensional Face Reorientation

In situations where the target and/or desired face are tilted to one direction or rotated, the modified face will not look natural. The way to resolve this issue is by performing (optionally, only if a user requests so) a three dimensional face reorientation or correction.

Figure 20:
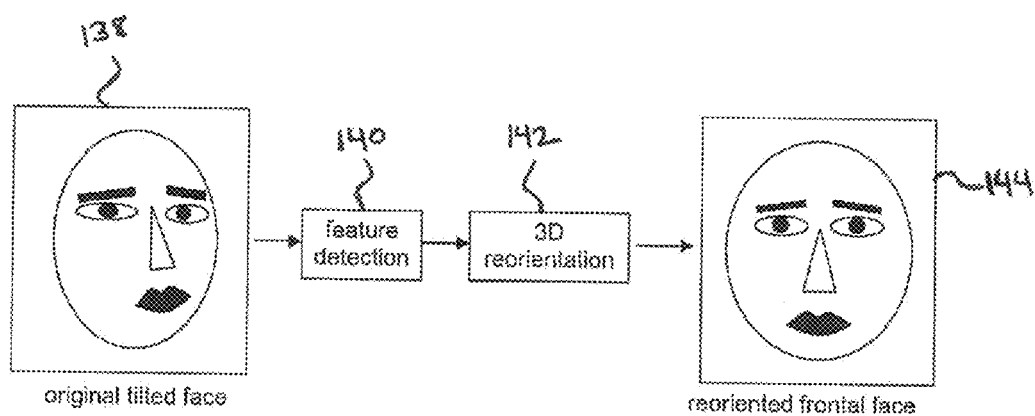
FIG. 20 illustrates the three dimensional face reorientation process.

It is assumed that both the final reoriented face and the original face lie on two different two-dimensional planes in three-dimensional space. The goal is to shift one plane to become horizontal to the look direction of the camera with which the photo was taken. FIG. 20 illustrates an example of this process whereby an original tilted face (138) is address through feature detection (140) and three dimensional (3D) reorientation (142) to generate a reoriented frontal face (144).

A two-dimensional plane in three-dimensional space can be projected onto another plane according to the following algebraic formula:

$$\begin{bmatrix} x \\ y \\ 1 \end{bmatrix} = P \cdot \begin{bmatrix} X \\ Y \\ 1 \end{bmatrix}$$

Where (x,y) are a point on the first plane, (X,Y) are a point on the second plane, and P is a 3 by 3 matrix which contains the projective transformation parameters.

When we have located the left eye, the right eye, and lips, we obtain a set of coordinates on the face-plane (here, we are assuming that the face is in fact just a plane), as follows:

Lip location=(mx,my)

Left eye location=(lx,ly)

Right eye location=(rx,ry)

We also have the ideal location of the facial features on a frontal face. This ideal location will be denoted as follows:

Ideal lip location=(Mx,My)

Ideal left eye location=(Lx,Ly)

Ideal right eye location=(RX,Ry)

The goal is to project the original face plane onto the ideal face plane, as follows:

$$\begin{bmatrix} mx & lx & rx \\ my & ly & ry \\ 1 & 1 & 1 \end{bmatrix} = P \cdot \begin{bmatrix} Mx & Lx & Rx \\ My & Ly & Ry \\ 1 & 1 & 1 \end{bmatrix}$$

Three points on each plane are enough to find the project transformation between the plans, as follows:

$$P = \begin{bmatrix} mx & lx & rx \\ my & ly & ry \\ 1 & 1 & 1 \end{bmatrix} \cdot \begin{bmatrix} Mx & Lx & Rx \\ My & Ly & Ry \\ 1 & 1 & 1 \end{bmatrix}^{-1}$$

One the projection matrix P is found, it is applied to every point on the image in order to result in a re-oriented face. The projected face and feature locations are also determined through this transformation.

Iterative Face and Facial Feature Detection

In order to improve the results of face detection, and to make the face detection more reliable and consistent, an iterative approach is used to automatically check the validity of a detected face, as follows:

1. For each detected face, a new face score is computed, where this face score is a multiplication of the original face score and a feature score.

2. The mature scores are a multiplication, of a parameter that measures the deviation-from-norm of the feature positions and individual validity metrics (including gradient magnitude symmetry) for the features.

3. If the facescore, featurescore, or their multiplication, is below a preset threshold, the face detection is performed again to find another region within the image that has the maximum facescore*featurescore.

In other words, the feature likelihoods are included in the face score calculations. Another benefit of this approach is that by detecting features at the face detection stage, if is possible to compensate for tilts and rotations easily based on the locations of the features.

Facelift

This section outlines in detail the procedure for the facelift operation. For the facelift operations upon an image of a face (146), the following steps are performed:

1. The facial features (eyes, nose, and lips) are detected (148) and extracted (150) (i.e. copies are made of these original features).

2. The face is lifted by smoothing it (156), either selectively to give the appearance of specific operations, or in entirety with uniform smoothing in the middle of the face and less smoothing around the edges of the face.
3. The original features are blended back onto the smoothed/lifted face (152) to generate an image of the results of the facelift (154).

Figure 21:
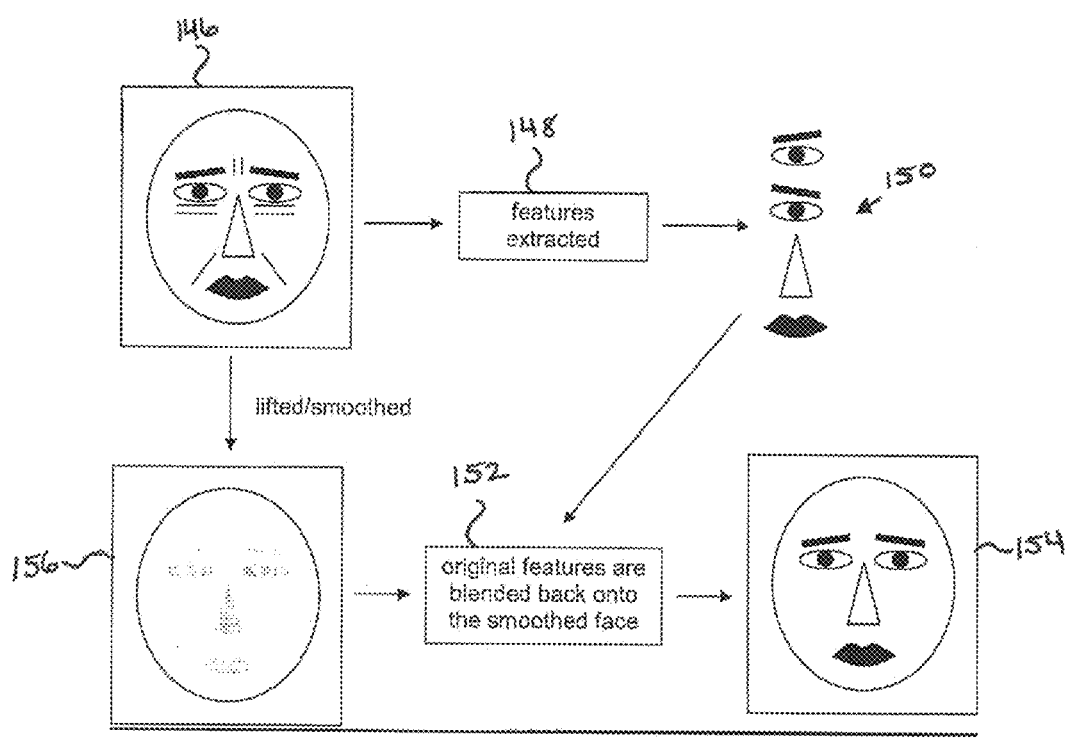
FIG. 21 illustrates the facelift operation process, in the drawings, embodiments of the invention are illustrated by way of example. It is to be expressly understood that the description and drawings are only for the purpose of illustration and as an aid to understanding, and are not intended as a definition of the limits of the invention.

An example of a facelift process is shown in FIG. 21.

Selective Automated Facelift

Figure 14:
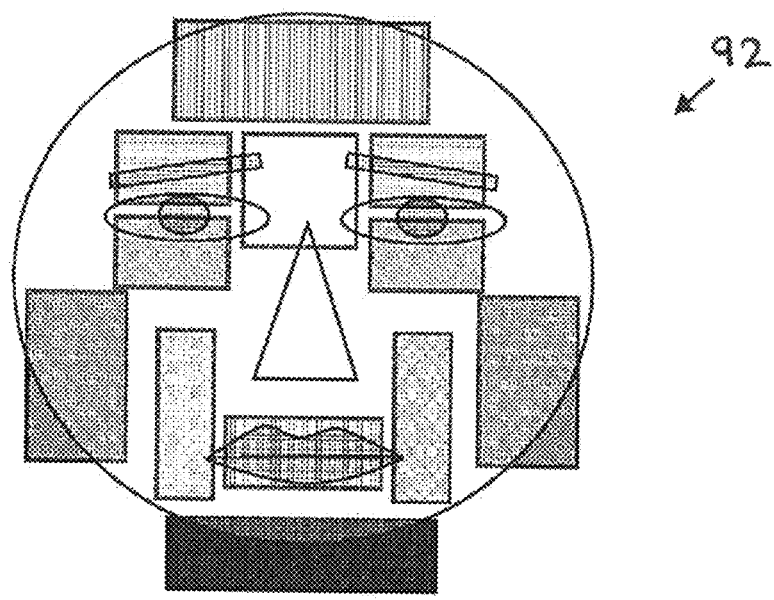
FIG. 14 illustrates the modifications available for a selective automated facelift.

The invention can also be utilized for visualizing the effects of a detailed or selective facelift operation or plurality of operations. A user can request selective partial facelifts, aside from a full facelift which would operate on the entire face. For example, a user could be shown an image of a template face or the user face (92), as shown in FIG. 14, and the user could then select which parts of the face should undergo plastic surgery. This particular process relics on the methods described above. The steps involved with this process are as follows:

1. The system automatically detects the face of the person in a user uploaded or selected photo.
2. The system detects the features (eyes, lips, nose) within the face in order to get bearings on the face.
3. The user selects either a full facelift option, or a subset of partial options including but not limited to forehead lifts, eyebrow lifts, bellow eye lifts, inter-brow lilts, outer cheek lifts, inner cheek lifts, lip enhancement and lip lifts, as well as jaw restoration and jaw lifts.
4. Based on the user selected partial operations, the system performs the operation as follows:
a. The system first extracts the face features (eyes, lips, nose);
b. The system performs the selective surgery visualizations by either smoothing (convolving with a two-dimensional smoothing filter) the specific region or adjusting its size (for example, in the case of a brow lift or lip enhancement, the vertical dimensions of the eyebrows or lips are increased in order to give the impression of feature adjustment); and
c. The extracted features are blended back onto the face, either at their original size or slightly adjusted in size in order to give the impression of an adjustment.

An example of the possible modifications available for the selective automated facelifts is shown in FIG. 14.

Figure 15:
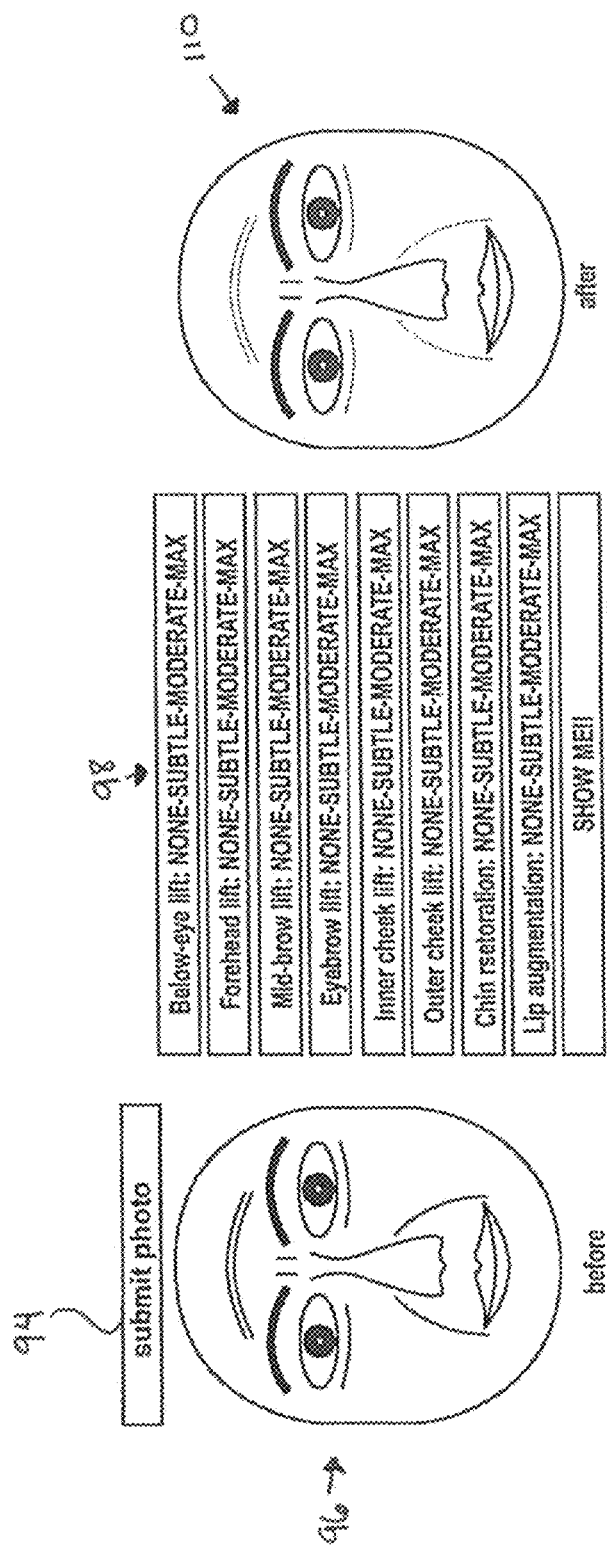
FIG. 15 illustrates the interface for a selective automated facelift.

An alternative realization of a selective facial lift and facial augmentation system is described below, which consists of a user uploading a photo (94) to a computer server and the system automatically detecting the face (96), and allowing for user refinement of this face, followed by the user selection of a set of automatic facial operations (98) (such as below-eye lift, forehead lift, mid-brow lift, eyebrow lift, inner cheek lift, outer cheek lift, chin restoration, lip augmentation) and operation strengths (none, subtle, moderate, and max). The user then selects a "Show Me" button or equivalent which initiates the processing of the user uploaded image automatically according to the user operation specification, showing the resulting image (110) once the processing is complete. An example of the interface for a selective automated facelift is shown in FIG. 15.

Details of Selective Face Modification Procedures

The following outlines the details of the specific facial modification procedures. For the procedures, the first step is generally to take an image $I(x,y)$ submitted by the user on a website, sent by a mobile phone, or other means, and to: compute (1) the location of the face, and (2) to extract the facial sub-image to form the face image $F(x,y)$. Then as previously described in FIG. 1, the face image is smoothed by convolving it with a smoothing filter, as follows:

$$\text{Smoothed face}=S(x,y)=F(x,y)*Q(x,y)$$

Where '*' denotes a two dimensional convolution operation and $Q(x,y)$ is a smoothing/averaging mask.

Once the smoothed face is obtained through the above filtering procedure, the left eye, right eye, nose, and lip sub images are also found in the original face image $F(x,y)$ using the approach described previously in ibis disclosure. The sub images are denoted as $LE(x,y)$, $RE(x,y)$, $N(x,y)$, and $L(x,y)$, in order to denote the loft eye, right eye, nose, and hp sub images respectively.

One or more of the specific facial modification operations are then performed using the above sub images. As explained earlier the facial modification operations are not exhaustive, and others as possible. The specific operations described herein are: (i) below-eye lift, (ii) forehead lift, (iii) mid-brow lift, (iv) inner cheek lift, (v) outer cheek lift, (vi) chin restoration, (vii) eyebrow lift, (viii) lip augmentation, and (ix) combination of the above.

Below-Eye Lift

A below-eye lift consists of lifting or removing the wrinkles directly around and below the eyes. This is achieved by:

1. Applying a below-eye mask to the original face image $F(x,y)$ (applying implies pixel-by-pixel multiplication) (i.e. $U(x,y)=F(x,y)\times M(x,y)$).
2. Applying the inverse (i.e. one minus) of the below-eye mask to the smoothed face image $S(x,y)$ (i.e. $V(x,y)=S(x,y)\times(1-M(x,y))$).
3. Adding the resulting sub images of 1 and 2 ($P(x,y)=U(x,y)+V(x,y)$).
4. Combining the original face image $F(x,y)$, times a strength weight, plus the result of 3, times one minus the strength weight (i.e. $Z(x,y)=aF(x,y)+(1-a)P(x,y)$).
(note: the strength, factor 'a' is determined based on the strength of the operation. As an example, for operation:NONE, 'a' would be 1, tor operation:SUBTLE, 'a' could be 0.8, tor operation:MODERATE, 'a' could be 0.6, and for operafion:MAX, 'a' could be 0.4.).
5. The left eye, right eye, nose, and lip sub images are blended on top of the processed face image $Z(x,y)$ using the feature blending approach described previously in this disclosure.

Forehead Lift

A forehead lift consists of lifting or removing the wrinkles directly in the forehead area of the face. This is achieved by:

1. Applying a forehead mask to the original face image $F(x,y)$ (applying implies pixel-by-pixel multiplication) (i.e. $U(x,y)+F(x,y)\times M(x,y)$).
2. Applying the inverse (i.e. one minus) of the forehead mask to the smoothed face image $S(x,y)$ (i.e. $V(x,y)=S(x,y)\times(1-M(x,y))$).
3. Adding the resulting sub images of 1 and 2 ($P(x,y)=U(x,y)+V(x,y)$).
4. Combining the original face image $F(x,y)$, times a strength weight plus the result of 3, times one minus the strength weight (i.e. $Z(x,y)=aF(x,y)+(1-a)P(x,y)$).
(note: the strength factor 'a' is determined based on the strength, of the operation. As an example, for operation:NONE, 'a' would be 1, for operation:SUBTLE, 'a' could be 0.8, for operation:MODERATE, 'a' could be 0.6, and for operation:MAX, 'a' could be 0.4.)

5. The left eye, right eye, nose, and lip sub images are blended on top of the processed face, image Z(x,y) using the feature blending approach described previously in this disclosure.

Mid-Brow Lift

The mid-brow lift consists of lifting or removing the wrinkles directly between the eyebrows. This is achieved by:
1. Applying a mid-brow mask to the original face image F(x,y) (applying implies pixel-by-pixel multiplication) (i.e. U(x,y)=F(x,y)×M(x,y)).
2. Applying the inverse (i.e. one minus) of the mid-brow mask to the smoothed face image S(x,y) (i.e. V(x,y)=S(x,y)×(1−M(x,y))).
3. Adding the resulting sub images of 1 and 2 (P(x,y)=U(x,y)+V(x,y)).
4. Combining the original face image F(x,y), times a strength weight, plus the result of 3, times one minus the strength weight (i.e. Z(x,y)=aF(x,y)+(1−a)P(x,y)).
   (note: the strength factor 'a' is determined based on the strength of the operation. As an example, for operation:NONE, 'a' would be 1, for operation:SUBTLE, 'a' could be 0.8., for operation:MODERATE, 'a' could be 0.6, and for operation:MAX, 'a' could be 0.4.).
5. The left eye, right eye, nose, and lip sub images are blended on top of the processed face image Z(x,y) using the feature, blending approach described previously in this disclosure.

Inner Cheek Lift

An inner cheek lift consists of lifting the skin and removing the wrinkles directly around the lips and nose. This is achieved by:
1. Applying an inner cheek mask to the original face image F(x,y) (applying implies pixel-by-pixel multiplication) (i.e. U(x,y)=F(x,y)×M(x,y)).
2. Applying the inverse (i.e. one minus) of the inner check mask to the smoothed face image S(x,y) (i.e. V(x,y)=S(x,y)×(1−M(x,y))).
3. Adding the resulting sub images of 1 and 2 (P(x,y)=U(x,y)+V(x,y)).
4. Combining the original face image F(x,y), times a strength weight, plus the result of 3, times one minus the strength weight (i.e. Z(x,y)=aF(x,y)+(1−a)P(x,y)).
   (note: the strength factor 'a' is determined based on the strength of the operation. As an example, for operation:NONE, 'a' would be 1, for operation:SUBTLE, 'a' could be 0.8, for operation:MODERATE, 'a' could be 0.6, and for operation:MAX, 'a' could be 0.4.)
5. The left eye, right, eye, nose, and lip sub images are blended on top of the processed face image Z(x,y) using the feature blending approach described previously in this disclosure.

Outer Cheek Lift

An outer cheek lift consists of lifting and removing the wrinkles in the outer cheeks area of the face, as well as removing imperfections as a result of aging. This is achieved by:
1. Applying an outer cheek mask to the original face image F(x,y) (applying implies pixel-by-pixel multiplication) (i.e. U(x,y)=F(x,y)×M(x,y)).
2. Applying the inverse (i.e. one minus) of the outer cheek mask to the smoothed face image S(x,y) (i.e. V(x,y)=S(x,y)×(1−M(x,y))).
3. Adding the resulting sub images of 1 and 2 (P(x,y)=U(x,y)+V(x,y)).
4. Combining the original face image F(x,y), times a strength weight, plus the result of 3, times one minus the strength weight (i.e. Z(x,y)=aF(x,y)+(1−a)P(x,y)).
   (note: the strength factor 'a' is determined based on the strength of the operation. As an example, for operation:NONE, 'a' would be 1, for operation:SUBTLE, 'a' could be 0.8, for operation:MODERATE, 'a' could be 0.6, and for operafion:MAX, 'a' could be 0.4.)
5. The left eye, right eye, nose, and lip sub images are blended on top of the processed face image Z(x,y) using the feature blending approach described previously in this disclosure.

Chin Restoration

Chin restoration consists of lifting the skin and removing the signs, of aging around the jaw and chin of the face. This is achieved by:
1. Applying a chin mask to the original face image F(x,y) (applying implies pixel by-pixel multiplication) (i.e. U(x,y)=F(x,y)×M(x,y)).
2. Applying the inverse (i.e. one minus) of the chin mask, to the smoothed face image S(x,y) (i.e. V(x,y)=S(x,y)×(1−M(x,y))).
3. Adding the resulting sub images of 1 and 2 (P(x,y)=U(x,y)+V(x,y)).
4. Combining the original face image F(x,y), times a strength weight, plus the result of 3, times one minus the strength weight (i.e. Z(x,y)=aF(x,y)+(1−a)P(x,y)).
   (note: the strength factor 'a' is determined based on the strength of the operation. As an example, for operation:NONE, 'a' would be 1, tor operation:SUBTLE, 'a' could be 0.8, for operation:MODERATE, 'a' could be 0.6, and for operation:MAX, 'a' could be 0.4.)
5. The left eye, right eye, nose, and lip sub images are blended on top of the processed face image Z(x,y) using the feature blending approach described previously in this disclosure.

Eyebrow Lift

An eyebrow lilt consists of lifting the eyebrows in order to reduce and remove the signs of aging around the eyebrows. This is achieved by:
1. Extending the left eye and right eye locations to cover the eyebrows of the face.
2. Stretching the extended left and right eye sub images based on the strength factor of the operation (i.e. vertically sealing the left and right sub images by a factor 'a').
   (note: the strength factor 'a' is determined based on the strength of the operation. As an example, for operation:NONE, 'a' would be 1, for operation:SUBTLE, 'a' could be 1.05, for operation:MODERATE, 'a' could be 1,1, and for operation:MAX, 'a' could be 0.15.)
3. The scaled left eye and scaled right eye sub images are blended on top of the original face F(x,y) using the feature blending approach described previously in this disclosure.

Lip Augmentation

Lip augmentation consists of lilting the lips in order to reduce and remove the signs of aging around the lips. This is achieved by:
1. Stretching the lip location sub image based on the strength factor of the operation (i.e. vertically sealing the left and right sub images by a factor 'a').
   (note: the strength factor 'a' is determined based on the strength of the operation. As an example, for operation:NONE, 'a' would be 1, for operation:SUBTLE, 'a' could be 1.05, for operation:MODERATE, 'a' could be 1.1, and for operation:MAX, 'a' could be 0.15.)

2. The sealed lip sub image is blended on top of the original face F(x,y) using the feature blending approach described previously in this disclosure.

Combination of the above

The above approaches can be combined by repeatedly applying each operation, using possibly different strength factors, on a face. Here, for example, the first operation is performed on the original face, following by another operation being perforated on the result of the first operation, and so forth. The end result is an automatic system for facelifting and face perfecting which uses the guidelines of a user to perform specific facial operations.

If should be understood that the image modifications that replicate cosmetic procedures, as described above (i.e. brow lifts, mid-brow lifts, forehead, lifts and enhancement, under-eye and near-eye skin lifts and enhancements, inner cheek lifts and enhancement, outer cheek lifts and enhancement, lip enhancement and augmentation, jaw/chin enhancement and restoration or other facial and/or cosmetic operation), can be applied to digital images of a face to varying degrees. In one particular aspect of the present invention, a user can modify the "strength" levels of these particular image modifications, for example, by selecting (using a suitable graphic user interface) "no operation", "subtle operation", "moderate operation" or "maximum operation". The result of the image modification, i.e. the image of the face smoothed, enhanced or augmented in accordance with the mentioned procedures can be displayed or otherwise, made available to the user. For example, the modified image can be displayed on a computer or communication, device, communicated via the communication network as a download, email communication or other communication.

Fusion Based Detection Approach

As mentioned above, the present invention contemplates use of prior art face detection techniques. In another aspect of the present invention, a "fusion-based" face detection method is provided. Specifically, a method is disclosed for face detection which involves fusion of a plurality of simple face detector techniques described below to provide a face detection technique with improved characteristics.

As shown in FIG. 11a, a face search inside a user submitted image (80) using starts with a large box with the height to width ratio being 4 to 3, and with the width being 60% of the image width, for example. The box is moved to all locations inside the image one pixel at a time for greatest accuracy (this can be improved for further efficiency) (82). After the entire image has been searched, the width of the box is decreased (again one pixel at a time) with the height to width ratio remaining fixed at 4 to 3 (84). The progression is depicted in FIG. 11a, FIG. 11b and FIG. 11c starting with a search over the entire image with a large face box, and continuing with smaller face boxes until a suitable hit or a minimum face box threshold is reached.

For all box sizes and box locations, a face score is computed which corresponds to the likelihood of a face at that location. The box with the highest score is chosen as the face location and size estimate. This is similar to most, known template-based face detection, algorithms. Generally speaking, the most difficult and sensitive, part of template-based face detection is the score computations.

Face Detection Metrics

I(x,y) will denote the original image at location (x,y). The content of each location, are a 3-element vector of red, green, and blue components (i.e. RGB) for each pixel. Ψ(x,y) will denote the gradient magnitude (in the vertical direction) of the image I(x,y), and consists of a non-negative value for each location (x,y). T(x,y) will be a binary template image used to fit a binary template to the face.

It should be understood that all face score metrics are a function of the location and size of the current box. The top left corner of this box is denoted as $(x_0, y_0)$, while the width and height of the box are denoted as W and H, respectively.

It should also be noted that for visual simplicity, we have used E to denote the expected value of a certain variable, where the expectation is usually performed over the x and y variables. This theoretical expectation is practically estimated as follows:

$$E[Z(x, y)] \cong c \cdot \sum_y \sum_x Z(x, y)$$

where Z(x,y) is some function of x and y, and where c is a normalization constant. Several metric approaches are possible.

A. Symmetry-Based (SYM) Face Detection Metric

Figure 12:
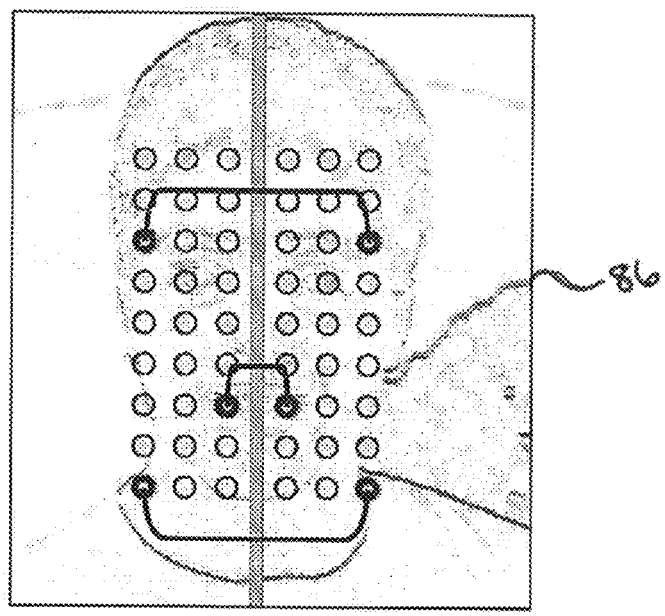
FIG. 12 illustrates face symmetry calculation where the average pair-wise square error between mirror pixels is used as an indication of the face asymmetry (or, the inverse of it as an indication of the face symmetry)

This approach is a mirror mean square error measure applied to the image gradient. It consists of folding the current face box from the middle and taking the average of the pair-wise square difference of the points inside the box that overlap (86), as shown in FIG. 12.

The motivation here is that if the box is perfectly symmetrical in the vertical axis running through the middle of the box, then it will have the smallest mean square difference. In other words, this is a measure of horizontal symmetry of the current face box.

For the actual metric, a constant is optionally added to the mean square difference and invert, so that a higher metric is indicative of greater symmetry. The final symmetry metric is:

$$F_{sym}(x_0, y_0, W, H) = (1 + E[|\Psi(x, y) - \Psi(W + 2x_0 - x, y)|])^{-1} \cong$$

$$\left(1 + \frac{2}{HW} \sum_{x=x_0}^{x_0+W/2-1} \sum_{y=y_0}^{y_0+H-1} |\Psi(x, y) - \Psi(W + 2x_0 - x, y)|\right)^{-1}$$

B. Template Subtraction (TS) Face Detection Metric

The template subtraction metric measures the degree to which the current face box resembles a face. It consists of applying a binary face template which is used to differentiate between the high gradient and the low gradient regions of a face.

Figures 13A, 13B:
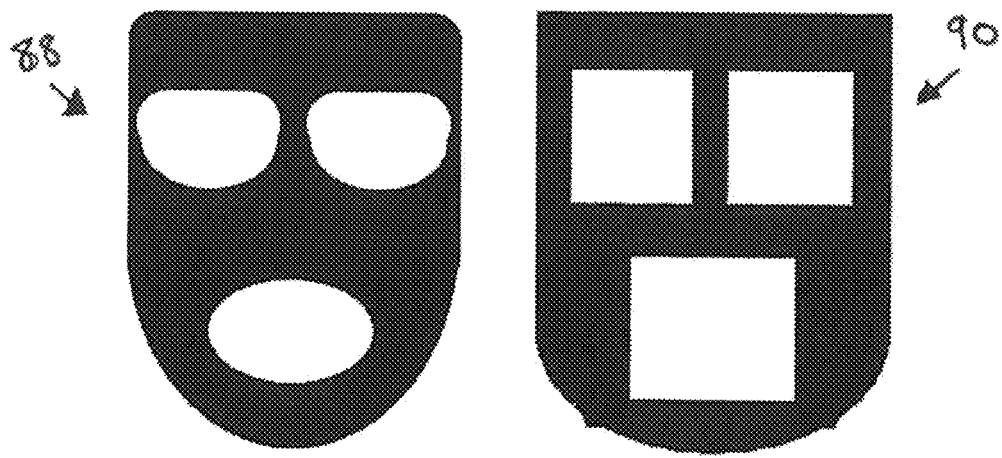
FIG. 13a and FIG. 13b illustrate example templates for face detection purposes.

A simple template (88), as shown in FIG. 13a, was utilized, though other choices, such as the template choice (90) shown in FIG. 13b, would yield similar results. These models were based on general characteristics of the face (i.e. drawn by the author in a matter of seconds), and were not in any way trained or optimized for the face detection task.

The template subtraction metric can be simply stated as the average gradient magnitude of the pixels corresponding to the white (1) template pixels, minus the average gradient magnitude of the pixels corresponding to the black (0) template pixels. In other words, the template subtraction metric can be defined as:

$$F_{TS}(x_0, y_0, W, H) = E[\Psi(x, y) | T(x, y) = 1] - E[\Psi(x, y) | T(x, y) = 0] \cong$$

$$\frac{\sum_{x=x_0}^{x_0+W-1} \sum_{y=y_0}^{y_0+H-1} \Psi(x, y) \cdot T(x, y)}{\sum_{x=x_0}^{x_0+W-1} \sum_{y=y_0}^{y_0+H-1} T(x, y)} - \frac{\sum_{x=x_0}^{x_0+W-1} \sum_{y=y_0}^{y_0+H-1} \Psi(x, y) \cdot (1 - T(x, y))}{\sum_{x=x_0}^{x_0+W-1} \sum_{y=y_0}^{y_0+H-1} (1 - T(x, y))}$$

C. Template Ratio (TM) Face Detection Metric

The template ratio, which is another template based metric, is the average gradient, magnitude of the pixels corresponding to the white (1) pixels of the template divided by the sum of both the average gradient magnitude of the white (1) template pixels and the average gradient magnitude of the black (0) template pixels, as defined below:

$$F_{TR}(x_0, y_0, W, H) = \frac{E[\Psi(x,y) | T(x,y)=1]}{E[\Psi(x,y) | T(x,y)=1] + E[\Psi(x,y) | T(x,y)=0]} \cong$$

$$\left(1 + \frac{\left(\sum_{x=x_0}^{x_0+W-1}\sum_{y=y_0}^{y_0+H-1} T(x,y)\right) \cdot \sum_{x=x_0}^{x_0+W-1}\sum_{y=y_0}^{y_0+H-1} \Psi(x,y) \cdot (1-T(x,y))}{\left(\sum_{x=x_0}^{x_0+W-1}\sum_{y=y_0}^{y_0+H-1} (1-T(x,y))\right) \cdot \sum_{x=x_0}^{x_0+W-1}\sum_{y=y_0}^{y_0+H-1} \Psi(x,y) \cdot T(x,y)}\right)^{-1}$$

D. Skin-Detector-Based (SKIN) Face Detection Metric

A pixel skin detector was employed to find the skin-like regions inside the image using a known technique, and to use the amount of skin in each test patch as an indication of the likelihood of a face.

The pixel (x,y) of image I(x,y) is skin, or skin(I(x,y))=1, if the red (R), green (G), and blue (B) components of that pixel obey the following conditions, for example:

R>95 and G>40 and B>20 and R−G>15 and R>B, or

R>220 and G>210 and B>170 and |R−G|<=15 and R>B and G>B

The skin-based face detection metric can thus be defined as:

$$F_{skin}(x_0, y_0, W, H) = E[skin(I(x,y))] \cong \frac{1}{HW} \sum_{x=x_0}^{x_0+W-1}\sum_{y=y_0}^{y_0+H-1} skin(I(x,y))$$

E. Eye-Lip Total Symmetry (ELTS) Face Detection Metric

The ELTS metric measures the ratio of the sum of gradients in the top half of the face to the sum of gradients in the whole face, as defined below:

$$F_{ELTS}(x_0, y_0, W, H) =$$

$$\frac{E[\Psi(x,y) | x,y \text{ in top half of face}]}{E[\Psi(x,y)]} \cong \frac{\sum_{x=x_0}^{x_0+W-1}\sum_{y=y_0}^{y_0+H/2-1}\Psi(x,y)}{\sum_{x=x_0}^{x_0+W-1}\sum_{y=y_0}^{y_0+H-1}\Psi(x,y)}$$

Ideally, a face should have strong gradients around the eyes and the lips/nose, making the ideal ELTS measure at around 0.5. As a result, the following adjustment is done to the final ELTS measure:

$$\hat{F}_{ELTS}(.) = \min(F_{ELTS}(.), 1 - F_{ELTS}(.))$$

F. Eye Total Symmetry (ETS) Face Detection Metric

Similar to the ELTS, the ETS measures the symmetry of the total gradients in the top half of the face. It is the ratio of the gradient sum in the top left quadrant of the face to the gradient sum of the top half of me face, as defined below:

$$F_{ETS}(x_0, y_0, W, H) =$$

$$\frac{E[\Psi(x,y) | x,y \text{ in top left quadrant}]}{E[\Psi(x,y) | x,y \text{ in top half of face}]} \cong \frac{\sum_{x=x_0}^{x_0+W/2-1}\sum_{y=y_0}^{y_0+H/2-1}\Psi(x,y)}{\sum_{x=x_0}^{x_0+W-1}\sum_{y=y_0}^{y_0+H/2-1}\Psi(x,y)}$$

As before, in an ideal case the ETS measure should be a 0.5. Consequently, the following adjustment is performed to the ETS measure to ensure that its maximum value is 0.5:

$$\hat{F}_{ETS}(.) = \min(F_{ETS}(.), 1 - F_{ETS}(.))$$

G. Lip Total Symmetry (LTS) Face Detection Metric

Just like the ETS, the LTS measure the symmetry of the gradient sums in the bottom, half of the image, as defined below:

$$F_{LTS}(x_0, y_0, W, H) =$$

$$\frac{E[\Psi(x,y) | x,y \text{ in bottom left quadrant}]}{E[\Psi(x,y) | x,y \text{ in bottom half of face}]} \cong \frac{\sum_{x=x_0}^{x_0+W/2-1}\sum_{y=y_0+H/2}^{y_0+H-1}\Psi(x,y)}{\sum_{x=x_0}^{x_0+W-1}\sum_{y=y_0+H/2}^{y_0+H-1}\Psi(x,y)}$$

As before we adjust the LTS such that its maximum and ideal value is 0.5, as follows:

$$\hat{F}_{LTS}(.) = \min(F_{LTS}(.), 1 - F_{LTS}(.))$$

H. Fusion Face Detection Metric

It was determined that combination of the above parameters results in very reliable face detection results relative to the results achieved by prior art methods. The following combined detector is a fusion of five of the above metrics described above:

$$F_{fusion}(.) = F_{skin}(.) \cdot F_{sym}(.) \cdot F_{TS}(.) \cdot F_{TR}(.) \cdot F_{ELTS}(.)$$

It will be appreciated, by those skilled in the art that other variations of the embodiments described herein may also be practiced -without department from the scope of the invention.

I claim:

1. A method for recommending one or more products to a user: (a) receiving a plurality of digital images showing a person provided by the user; (b) detecting a face of the person in the plurality of digital images; (c) establishing a plurality of regions of interest in the face in the plurality of digital images; (d) detecting one or more features in the plurality of regions of interest in the face in the plurality of digital images, said one or more features including one or more facial features of interest and one or more other facial features, involving the use of image gradient intensities to detect a plurality of individual features if the location of features in the plurality of digital Images is not previously established; (e) performing multi-level statistical analysis of the plurality of digital images to produce user information; (f) displaying user information to the user; and (g) recommending one or more products to the user, based on a database of products reviewed in accordance with the multi-level statistical analysis.

2. The method of claim 1, further comprising the step of: modifying a digital image from the plurality of digital images by modifying one or more features in the face in the digital image by combining the one or more features in the digital image with corresponding features in relating to the one or more products recommended to the user by blending the one or more features relating to the one or more products recommended to the user into the digital image, thereby defining a modified digital image.

3. The method of claim 1 wherein the features include eyes, eyebrows, nose, mouth, lips or hair.

4. The method of claim 1 further comprising blending, recoloring, shifting or resizing the one or more features in the face in the second digital image.

5. The method of claim 1 further comprising adjusting size and location of the one or more features in the face in the second digital image in the modified digital image to increase the perceived beauty of a face in the modified digital image.

6. The method of claim 1 farther comprising color adjusting the one or more features in the face in the second digital image to correspond with the face in the first digital image, or color adjusting the features of the face in the first digital image to correspond to the modified first digital image.

7. The method of claim 5 comprising the further step of undertaking the multi-level statistical analysis of the plurality of digital images to incorporate analysis of the plurality of digital images as individual images and as a collection of images.

8. The method of claim 7 comprising the further step, of assigning a vote to each of the plurality of images and the vote is binary or real-valued.

9. The method of claim 8 comprising the further step of generating a neural network connection through use of the vote being real-valued.

10. The method of claim 5 wherein the plurality of digital images are derived from video, by the step of detecting a plurality of video frames in the video that show the person.

11. A system for recommending one or more products to a user comprising: (a) a computer linked to a database, the computer including or being linked to a utility for enabling one or more users upload, store, retrieve, email, display and/or manage digital images; (b) a processing utility linked to the computer, the processing utility being operable to provide instructions to the computer that enable the computer to: (i) receive a plurality of digital images showing a person provided by the user; (ii) defect a face of the person in the plurality of digital images; (iii) establish a plurality of regions of interest in the face in the plurality of digital images; (iv) detect one or more features in the plurality of regions of interest in the face in the plurality of digital images, said one or more features including one or more facial features of interest and one or more other facial features, involving the use of image gradient intensities to detect a plurality of individual features if the location of features in the plurality of digital images is not previously established; (v) perform multi-level statistical analysis of the plurality of digital images to produce user information; (vi) display user information to the user; and (vii) recommend one or more products to the user, based on a database of products reviewed in accordance with the multi-level statistical analysis.

12. The system of claim 11, wherein the processing utility is operable to provide instructions to the computer that enable the computer to modify one or more features in the face in the digital image by combining the one or more features in the digital image with corresponding features in relating to the one or more products recommended to the user by blending the one or more features relating to the one or more products recommended to the user into the digital image, thereby defining a modified digital image.

13. The system of claim 11, wherein the system is provided to the user as a website or as an application on a mobile computing device.

14. The system of claim 11, wherein the system is operable to apply the multi-level statistical analysis to the plurality of digital images, said multi-level statistical analysis incorporating an analysis of the plurality of digital images as individual images and as a collection of images.

15. The system of claim 14, wherein the system the multi-level statistical analysis involves the system assign, a vote to each of the plurality of images and the vote is binary or real-valued.

16. The system of claim 15, wherein the vote is real-valued and a neural network connection is generated based upon said vote.

17. The system of claim 11, wherein the plurality of digital images are derived from video, by the step of detecting a plurality of video frames in the video that show the person.

18. A non-transitory computer readable medium for recommending one or more products to a user, said non-transitory computer readable medium comprising; (a) a computer readable medium bearing software instructions; and (b) the software instructions for enabling the computer to perform, predetermined operations, the predetermined operations including the steps of: (i) receiving a plurality of digital images showing a person provided by the user; (ii) detecting a face of the person in the plurality of digital images; (iii) establishing a plurality of regions of interest in the face in the plurality of digital images; (iv) detecting one or more features in the plurality of regions of interest in the face in the plurality of digital images, said one or more features including one or more facial features of interest and one or more other facial features, involving the use of image gradient intensities to detect a plurality of individual features if the location of features in the plurality of digital images is not previously established; (v) performing multi-level statistical analysis of the plurality of digital images to produce user information; (vi) displaying user information to the user; and (vii) recommending one or more products to the user, based on a database of products reviewed in accordance with the multi-level statistical analysis.

19. The non-transitory computer readable medium of claim 18, wherein the software instructions include predetermined operations including the step of: modifying a digital image from the plurality of digital images by modifying one or more features in the face in the digital image by combining the one or more features in the digital image With corresponding features in relating to the one or more products recommended to the user by blending the one or more features relating to the one or more products recommended to the user into the digital image, thereby defining a modified digital image.

20. The non-transitory computer readable medium of claim 18, wherein the non-transitory computer readable medium is operable to apply the multi-level statistical analysis to the plurality of digital images, said multi-level statistical analysis: (a) incorporating an analysis of the plurality of digital images as individual images and as a collection of images; (b) assigning a vote to each of the plurality of images and the vote is binary or real-valued, said vote being real-valued; and (c) generating a neural network connection based upon the vote.

* * * * *